(12) United States Patent
Smith et al.

(10) Patent No.: US 7,777,675 B2
(45) Date of Patent: Aug. 17, 2010

(54) DEPLOYABLE PASSIVE BROADBAND AIRCRAFT TRACKING

(75) Inventors: Alexander E. Smith, McLean, VA (US); Russell Hulstrom, Williamstown (AU); Carl A. Evers, Vienna, VA (US)

(73) Assignee: ERA Systems Corporation, Reston, VA (US)

( * ) Notice: Subject to any disclaimer, the term of this patent is extended or adjusted under 35 U.S.C. 154(b) by 328 days.

(21) Appl. No.: 11/840,285

(22) Filed: Aug. 17, 2007

(65) Prior Publication Data

US 2008/0211709 A1  Sep. 4, 2008

Related U.S. Application Data

(63) Continuation-in-part of application No. 11/492,711, filed on Jul. 25, 2006, now Pat. No. 7,429,950, and a continuation-in-part of application No. 11/429,926, filed on May 8, 2006, now Pat. No. 7,477,193, and a continuation-in-part of application No. 11/343,079, filed on Jan. 30, 2006, now Pat. No. 7,375,683, and a continuation-in-part of application No. 11/342,289, filed on Jan. 28, 2006, now Pat. No. 7,576,695, and a continuation-in-part of application No. 11/257,416, filed on Oct. 24, 2005, now Pat. No. 7,495,612, and a continuation-in-part of application No. 11/209,030, filed on Aug. 22, 2005, now Pat. No. 7,248,219, and a continuation-in-part of application No. 11/203,823, filed on Aug. 15, 2005, and a continuation-in-part of application No. 11/145,170, filed on Jun. 6, 2005, now Pat. No. 7,437,250, and a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, which is a continuation-in-part of application No. 10/319,725, filed on Dec. 16, 2002, now Pat. No. 6,812,890.

(60) Provisional application No. 60/123,170, filed on Mar. 5, 1999, provisional application No. 60/440,618, filed on Jan. 17, 2003, provisional application No. 60/851,118, filed on Oct. 12, 2006.

(51) Int. Cl.
*G01S 3/02* (2006.01)

(52) U.S. Cl. .................................. 342/463; 342/456

(58) Field of Classification Search ................. 342/455, 342/456, 463, 465; 701/117, 120
See application file for complete search history.

(56) References Cited

U.S. PATENT DOCUMENTS 1,738,571 A   12/1929  Gare ........................... 404/18

(Continued)

FOREIGN PATENT DOCUMENTS

DE         4306660 A1      8/1974

(Continued)

OTHER PUBLICATIONS

*Application of Markov Process to Pavement Management Systems at the Network Level*, Abbas Ahmad Butt, University of Iillinois at Urbana-Champaign (1991).

(Continued)

*Primary Examiner*—Dao L Phan
(74) *Attorney, Agent, or Firm*—Robert Platt Bell

(57) ABSTRACT

In a first, preferred embodiment of the present invention, integrated tracking is provided using passive broadband. The invention takes the system for deployable passive broadband detection and extends it by incorporating the capability to decode position for ADS-B, SSR multilateration, and broadband multilateration. In a second embodiment, validation of a self-reported position is provided. The invention takes the system for deployable passive broadband detection and extends it by incorporating the capability to decode self-reported position for ADS-B, and compare it to line of calculated position, or line of precision, derived from multilateration techniques applied to various signals received from the aircraft. In a third embodiment, validation of a self-reported ADS-B position using independent surveillance is provided by the system.

7 Claims, 11 Drawing Sheets

U.S. PATENT DOCUMENTS

| | | | |
|---|---|---|---|
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,495 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 340/961 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/27 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,569,322 A | 10/1996 | Westerlage et al. | 364/464.27 |
| 5,570,095 A | 10/1996 | Drouilhet, Jr. et al. | 342/357 |
| 5,570,099 A | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 342/455 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jain | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,315 A | 5/1998 | Gounon et al. | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouce et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |

| Patent | Type | Date | Inventor | Class |
|---|---|---|---|---|
| 6,127,944 | A | 10/2000 | Daly | 340/963 |
| 6,133,867 | A | 10/2000 | Eberwine et al. | 342/29 |
| 6,138,060 | A | 10/2000 | Conner | 701/9 |
| 6,147,748 | A | 11/2000 | Hughes | 356/4.09 |
| 6,161,097 | A | 12/2000 | Glass et al. | 705/6 |
| 6,178,363 | B1 | 1/2001 | McIntyre et al. | 701/16 |
| 6,188,937 | B1 | 2/2001 | Sherry et al. | 701/14 |
| 6,194,040 | B1 | 2/2001 | Arethens | 342/357.12 |
| 6,195,609 | B1 | 2/2001 | Pilley | 701/120 |
| 6,201,499 | B1 | 3/2001 | Hawkes et al. | 342/387 |
| 6,208,284 | B1 | 3/2001 | Woodell et al. | 342/30 |
| 6,208,937 | B1 | 3/2001 | Huddle | 701/221 |
| 6,211,811 | B1 | 4/2001 | Evers | 342/36 |
| 6,219,592 | B1 | 4/2001 | Muller et al. | 701/9 |
| 6,222,480 | B1 | 4/2001 | Kuntman et al. | 342/30 |
| 6,225,942 | B1 | 5/2001 | Alon | 342/59 |
| 6,230,018 | B1 | 5/2001 | Watters et al. | 455/456 |
| 6,233,522 | B1 | 5/2001 | Morici | 701/208 |
| 6,239,739 | B1 | 5/2001 | Thomson et al. | 342/96 |
| 6,240,345 | B1 | 5/2001 | Vesel | 701/31 |
| 6,246,342 | B1 | 6/2001 | Vandevoorde et al. | 340/961 |
| 6,253,147 | B1 | 6/2001 | Greenstein | 701/202 |
| 6,271,768 | B1 | 8/2001 | Frazier, Jr. et al. | 340/961 |
| 6,275,172 | B1 | 8/2001 | Curtis et al. | 340/961 |
| 6,275,767 | B1 | 8/2001 | Delseny et al. | 701/120 |
| 6,282,487 | B1 | 8/2001 | Shiomi et al. | 701/120 |
| 6,282,488 | B1 | 8/2001 | Castor et al. | 701/120 |
| 6,289,280 | B1 | 9/2001 | Fernandez-Corbaton | 701/214 |
| 6,292,721 | B1 | 9/2001 | Conner et al. | 701/9 |
| 6,311,127 | B1 | 10/2001 | Stratton et al. | 701/213 |
| 6,314,361 | B1 | 11/2001 | Yu et al. | 701/120 |
| 6,314,363 | B1 | 11/2001 | Pilley et al. | 701/120 |
| 6,317,663 | B1 | 11/2001 | Meunier et al. | 701/16 |
| 6,321,091 | B1 | 11/2001 | Holland | 455/456 |
| 6,327,471 | B1 | 12/2001 | Song | 455/440 |
| 6,329,947 | B2 | 12/2001 | Smith | 342/418 |
| 6,337,652 | B1 | 1/2002 | Shiomi et al. | 342/37 |
| 6,338,011 | B1 | 1/2002 | Furst et al. | 701/1 |
| 6,339,745 | B1 | 1/2002 | Novik | 701/208 |
| 6,340,935 | B1 | 1/2002 | Hall | 340/932.2 |
| 6,340,947 | B1 | 1/2002 | Chang et al. | 342/357.01 |
| 6,347,263 | B1 | 1/2002 | Johnson et al. | 701/14 |
| 6,344,820 | B1 | 2/2002 | Shiomi et al. | 342/174 |
| 6,348,856 | B1 | 2/2002 | Jones et al. | 340/10.1 |
| 6,366,240 | B1 | 4/2002 | Timothy et al. | 342/417 |
| 6,377,208 | B2 | 4/2002 | Chang et al. | 342/357.01 |
| 6,380,869 | B1 | 4/2002 | Simon et al. | 340/945 |
| 6,380,870 | B1 | 4/2002 | Conner et al. | 340/970 |
| 6,384,783 | B1 | 5/2002 | Smith et al. | 342/387 |
| 6,393,359 | B1 | 5/2002 | Flynn et al. | 701/120 |
| 6,396,435 | B1 | 5/2002 | Fleischhauer et al. | 342/70 |
| 6,408,233 | B1 | 6/2002 | Solomon et al. | 701/35 |
| 6,414,629 | B1 | 7/2002 | Curico | 342/357.08 |
| 6,415,219 | B1 | 7/2002 | Degodyuk | 70/117 |
| 6,420,993 | B1 | 7/2002 | Varon | 342/36 |
| 6,445,310 | B1 | 9/2002 | Bateman et al. | 340/970 |
| 6,445,927 | B1 | 9/2002 | Kng et al. | 455/456 |
| 6,448,929 | B1 | 9/2002 | Smith et al. | 342/456 |
| 6,459,411 | B2 | 10/2002 | Frazier et al. | 342/455 |
| 6,462,674 | B2 | 10/2002 | Ohmura et al. | 340/901 |
| 6,463,383 | B1 | 10/2002 | Baiada et al. | 701/120 |
| 6,469,654 | B1 | 10/2002 | Winner et al. | 342/33 |
| 6,469,655 | B1 | 10/2002 | Franke et al. | 342/36 |
| 6,469,664 | B1 | 10/2002 | Michaelson et al. | 342/357.13 |
| 6,473,027 | B1 | 10/2002 | Alon | 342/37 |
| 6,473,694 | B1 | 10/2002 | Akopian et al. | 701/213 |
| 6,477,449 | B1 | 11/2002 | Conner et al. | 701/4 |
| 6,492,932 | B1 | 12/2002 | Jin et al. | 342/25 |
| 6,493,610 | B1 | 12/2002 | Ezaki | 701/3 |
| 6,504,490 | B2 | 1/2003 | Mizushima | 340/943 |
| 6,518,916 | B1 | 2/2003 | Ashihara et al. | 342/70 |
| 6,522,295 | B2 | 2/2003 | Baugh et al. | 342/453 |
| 6,531,978 | B2 | 3/2003 | Tran | 342/29 |
| 6,542,809 | B2 | 4/2003 | Hehls, III | 701/120 |
| 6,542,810 | B2 | 4/2003 | Lai | 701/120 |
| 6,545,631 | B2 | 4/2003 | Hudson et al. | 342/30 |
| 6,549,829 | B1 | 4/2003 | Anderson et al. | 701/16 |
| 6,563,432 | B1 | 5/2003 | Millgard | 340/961 |
| 6,567,043 | B2 | 5/2003 | Smith et al. | 342/450 |
| 6,571,155 | B2 | 5/2003 | Carriker et al. | 701/3 |
| 6,584,400 | B2 | 6/2003 | Beardsworth | 701/120 |
| 6,584,414 | B1 | 6/2003 | Green et al. | 702/33 |
| 6,587,079 | B1 | 7/2003 | Rickard et al. | 342/387 |
| 6,660,563 | B1 | 8/2003 | Corcoran, III | 701/301 |
| 6,606,034 | B1 | 9/2003 | Muller et al. | 340/970 |
| 6,615,648 | B1 | 9/2003 | Ferguson et al. | 73/146 |
| 6,617,997 | B2 | 9/2003 | Ybarra et al. | 342/29 |
| 6,618,008 | B1 | 9/2003 | Scholz | 342/427 |
| 6,633,259 | B1 | 10/2003 | Smith et al. | 342/456 |
| 6,657,578 | B2 | 12/2003 | Stayton | 342/30 |
| 6,680,697 | B2 | 1/2004 | Phelipot | 342/29 |
| 6,690,295 | B1 | 2/2004 | De Boer | 340/951 |
| 6,690,618 | B2 | 2/2004 | Tomasi et al. | 367/127 |
| 6,691,004 | B2 | 2/2004 | Johnson | 701/14 |
| 6,707,394 | B2 | 3/2004 | Yasuo | 340/970 |
| 6,710,719 | B1 | 3/2004 | Jones et al. | 340/825.49 |
| 6,710,723 | B2 | 3/2004 | Muller | 340/970 |
| 6,714,782 | B1 | 3/2004 | Monot et al. | 455/431 |
| 6,721,652 | B1 | 4/2004 | Sanqunetti | 701/207 |
| 6,744,396 | B2 | 6/2004 | Stone et al. | 342/36 |
| 6,750,815 | B2 | 6/2004 | Michaelson et al. | 342/357.13 |
| 6,751,545 | B2 | 6/2004 | Walter | 701/120 |
| 6,760,387 | B2 | 7/2004 | Langford et al. | 375/267 |
| 6,765,533 | B2 | 7/2004 | Szajnowski | 342/465 |
| 6,789,011 | B2 | 9/2004 | Baiada et al. | 701/120 |
| 6,789,016 | B2 | 9/2004 | Bayh et al. | 701/301 |
| 6,792,058 | B1 | 9/2004 | Hershey et al. | 375/347 |
| 6,798,381 | B2 | 9/2004 | Benner et al. | 342/450 |
| 6,799,114 | B2 | 9/2004 | Etnyre | 701/120 |
| 6,801,152 | B1 | 10/2004 | Rose | 342/13 |
| 6,801,155 | B2 | 10/2004 | Jahangir et al. | 342/90 |
| 6,809,679 | B2 | 10/2004 | LaFrey et al. | 342/37 |
| 6,810,329 | B2 | 10/2004 | Koga | 701/211 |
| 6,812,890 | B2 | 11/2004 | Smith et al. | 342/454 |
| 6,816,105 | B2 | 11/2004 | Winner et al. | 342/37 |
| 6,819,282 | B1 | 11/2004 | Galati et al. | 342/37 |
| 6,823,188 | B1 | 11/2004 | Stern | 455/456.1 |
| 6,828,921 | B2 | 12/2004 | Brown et al. | 340/945 |
| 6,845,362 | B2 | 1/2005 | Furuta et al. | 705/13 |
| 6,861,982 | B2 | 3/2005 | Forstrom et al. | 342/387 |
| 6,862,519 | B2 | 3/2005 | Walter | 701/120 |
| 6,862,541 | B2 | 3/2005 | Mizushima | 702/26 |
| 6,865,484 | B2 | 3/2005 | Miyasaka et al. | 701/213 |
| 6,873,269 | B2 | 3/2005 | Tran | 340/961 |
| 6,873,903 | B2 | 3/2005 | Baiada et al. | 701/120 |
| 6,876,859 | B2 | 4/2005 | Anderson et al. | 455/456.1 |
| 6,882,930 | B2 | 4/2005 | Trayford et al. | 701/117 |
| 6,885,340 | B2 | 4/2005 | Smith et al. | 342/465 |
| 6,900,760 | B2 | 5/2005 | Groves | 342/357.14 |
| 6,912,461 | B2 | 6/2005 | Poreda | 701/120 |
| 6,927,701 | B2 | 8/2005 | Schmidt et al. | 340/959 |
| 6,930,638 | B2 | 8/2005 | Lloyd et al. | 342/453 |
| 6,952,631 | B2 | 10/2005 | Griffith et al. | 701/13 |
| 6,963,304 | B2 | 11/2005 | Murphy | 342/357.02 |
| 6,967,616 | B2 | 11/2005 | Etnyre | 342/182 |
| 6,977,612 | B1 | 12/2005 | Bennett | 342/357.07 |
| 6,985,103 | B2 | 1/2006 | Ridderheim et al. | 342/30 |
| 6,985,743 | B2 | 1/2006 | Bajikar | 455/456.1 |
| 6,992,626 | B2 | 1/2006 | Smith | 342/454 |
| 7,006,032 | B2 | 2/2006 | King et al. | 342/29 |
| 7,012,552 | B2 | 3/2006 | Baugh et al. | 340/945 |
| 7,026,987 | B2 | 4/2006 | Lokshin et al. | 342/357.12 |
| 7,030,780 | B2 | 4/2006 | Shiomi et al. | 340/961 |
| 7,043,355 | B2 | 5/2006 | Lai | 701/120 |
| 7,050,909 | B2 | 5/2006 | Nichols et al. | 701/301 |
| 7,053,792 | B2 | 5/2006 | Aoki et al. | 340/928 |

| Patent No. | Date | Inventor | Class |
|---|---|---|---|
| 7,058,506 B2 | 6/2006 | Kawase et al. | 701/201 |
| 7,062,381 B1 | 6/2006 | Rekow et al. | 701/300 |
| 7,065,443 B2 | 6/2006 | Flynn et al. | 701/120 |
| 7,071,843 B2 | 7/2006 | Hashida et al. | 340/995.12 |
| 7,071,867 B2 | 7/2006 | Wittenberg et al. | 342/70 |
| 7,079,925 B2 | 7/2006 | Kubota et al. | 701/1 |
| 7,095,360 B2 | 8/2006 | Kuji et al. | 342/29 |
| 7,102,570 B2 | 9/2006 | Bar-On et al. | 342/465 |
| 7,106,212 B2 | 9/2006 | Konishi et al. | 340/905 |
| 7,109,889 B2 | 9/2006 | He | 340/971 |
| 7,117,089 B2 | 10/2006 | Khatwa et al. | 701/301 |
| 7,120,537 B2 | 10/2006 | Flynn et al. | 701/120 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 7,136,059 B2 | 11/2006 | Kraud et al. | 345/419 |
| 7,142,154 B2 | 11/2006 | Quilter et al. | 342/357.06 |
| 7,148,816 B1 | 12/2006 | Carrico | 340/961 |
| 7,155,240 B2 | 12/2006 | Atkinson et al. | 455/456.2 |
| 7,164,986 B2 | 1/2007 | Humphries et al. | 701/207 |
| 7,170,441 B2 | 1/2007 | Perl et al. | 342/29 |
| 7,170,820 B2 | 1/2007 | Szajnowski | 367/127 |
| 7,187,327 B2 | 3/2007 | Coluzzi et al. | 342/458 |
| 7,190,303 B2 | 3/2007 | Rowlan | 342/29 |
| 7,196,621 B2 | 3/2007 | Kochis | 340/539.13 |
| 7,206,698 B2 | 4/2007 | Conner et al. | 701/301 |
| 7,218,276 B2 | 5/2007 | Teranishi | 342/357.1 |
| 7,218,278 B1 | 5/2007 | Arethens | 342/367.03 |
| 7,221,308 B2 | 5/2007 | Burton et al. | 342/42 |
| 7,228,207 B2 | 6/2007 | Clarke et al. | 701/3 |
| 7,233,545 B2 | 6/2007 | Harvey, Jr. et al. | 367/127 |
| 7,248,963 B2 | 7/2007 | Baiada et al. | 701/120 |
| 7,250,901 B2 | 7/2007 | Stephens | 342/146 |
| 7,257,469 B1 | 8/2007 | Pemble | 701/3 |
| 7,272,495 B2 | 9/2007 | Coluzzi et al. | 701/207 |
| 7,277,052 B2 | 10/2007 | Delaveau et al. | 342/387 |
| 7,286,624 B2 | 10/2007 | Woo et al. | 375/356 |
| 7,307,578 B2 | 12/2007 | Blaskovich et al. | 342/29 |
| 7,308,343 B1 | 12/2007 | Horvath et al. | 701/3 |
| 7,321,813 B2 | 1/2008 | Meunier | 701/10 |
| 7,333,052 B2 | 2/2008 | Maskell | 342/195 |
| 7,333,887 B2 | 2/2008 | Baiada et al. | 701/120 |
| 7,352,318 B2 | 4/2008 | Osman et al. | 342/37 |
| 7,358,854 B2 | 4/2008 | Egner et al. | 340/539.13 |
| 7,379,165 B2 | 5/2008 | Anderson et al. | 356/5.05 |
| 7,382,286 B2 | 6/2008 | Cole et al. | 340/961 |
| 7,383,104 B2 | 6/2008 | Ishii et al. | 701/3 |
| 7,383,124 B1 | 6/2008 | Vesel | 701/200 |
| 7,385,527 B1 | 6/2008 | Clavier et al. | 340/945 |
| 7,391,359 B2 | 6/2008 | Ootomo et al. | 342/37 |
| 7,398,157 B2 | 7/2008 | Sigurdsson et al. | 701/3 |
| 7,400,297 B2 | 7/2008 | Ferreol et al. | 342/377 |
| 7,408,497 B2 | 8/2008 | Billaud et al. | 342/30 |
| 7,408,498 B2 | 8/2008 | Kuji et al. | 342/37 |
| 7,420,501 B2 | 9/2008 | Perl | 342/30 |
| 7,430,218 B2 | 9/2008 | Lee et al. | 370/464 |
| 7,437,225 B1 | 10/2008 | Rathinam | 701/14 |
| 7,440,846 B2 | 10/2008 | Irie et al. | 701/200 |
| 7,457,690 B2 | 11/2008 | Wilson, Jr. | 701/3 |
| 7,460,866 B2 | 12/2008 | Salkini et al. | 455/431 |
| 7,460,871 B2 | 12/2008 | Humphries et al. | 455/456.1 |
| 7,477,145 B2 | 1/2009 | Tatton et al. | 340/531 |
| 7,479,919 B2 | 1/2009 | Poe et al. | 342/30 |
| 7,479,922 B2 | 1/2009 | Hunt et al. | 342/357.02 |
| 7,479,923 B2 | 1/2009 | Carpenter | 342/357.02 |
| 7,479,925 B2 | 1/2009 | Schell | 342/455 |
| 7,487,108 B2 | 2/2009 | Aoki et al. | 705/13 |
| 7,501,977 B2 | 3/2009 | Ino | 342/37 |
| 7,504,996 B2 | 3/2009 | Martin | 342/357.12 |
| 7,515,715 B2 | 4/2009 | Olive | 380/255 |
| 2001/0014847 A1 | 8/2001 | Keenan | 701/117 |
| 2001/0026240 A1 | 10/2001 | Neher | 342/357.07 |
| 2002/0021247 A1 | 2/2002 | Smith et al. | 342/450 |
| 2002/0089433 A1 | 7/2002 | Bateman et al. | 340/970 |
| 2002/0152029 A1 | 10/2002 | Sainthuile et al. | 701/301 |
| 2003/0004641 A1 | 1/2003 | Corwin et al. | 701/301 |
| 2003/0009267 A1 | 1/2003 | Dunsky et al. | 701/4 |
| 2003/0097216 A1 | 5/2003 | Etnyre | 701/120 |
| 2003/0152248 A1 | 8/2003 | Spark et al. | 382/103 |
| 2003/0158799 A1 | 8/2003 | Kakihara et al. | 705/30 |
| 2004/0002886 A1 | 1/2004 | Dickerson et al. | |
| 2004/0004554 A1 | 1/2004 | Srinivasan et al. | 340/870.01 |
| 2004/0039806 A1 | 2/2004 | Miras | 709/223 |
| 2004/0044463 A1 | 3/2004 | Shing-Feng et al. | 701/120 |
| 2004/0086121 A1 | 5/2004 | Viggiano et al. | 380/255 |
| 2004/0094622 A1 | 5/2004 | Vismara | 235/384 |
| 2004/0210371 A1 | 10/2004 | Adachi et al. | 701/50 |
| 2004/0225432 A1 | 11/2004 | Pilley et al. | 701/117 |
| 2004/0266341 A1 | 12/2004 | Teunon | 455/12.1 |
| 2005/0007272 A1 | 1/2005 | Smith et al. | 342/189 |
| 2005/0021283 A1 | 1/2005 | Brinton et al. | 702/150 |
| 2005/0046569 A1 | 3/2005 | Spriggs et al. | 340/551 |
| 2005/0057395 A1 | 3/2005 | Atkinson | |
| 2005/0159170 A1 | 7/2005 | Humphries et al. | 455/456.1 |
| 2005/0166672 A1 | 8/2005 | Atkinson | 73/290 |
| 2005/0192717 A1 | 9/2005 | Tafs et al. | 701/3 |
| 2005/0228715 A1 | 10/2005 | Hartig et al. | 705/13 |
| 2005/0231422 A1 | 10/2005 | Etnyre | 342/182 |
| 2006/0023655 A1 | 2/2006 | Engel et al. | 370/328 |
| 2006/0044184 A1 | 3/2006 | Kimura | 342/357.09 |
| 2006/0052933 A1 | 3/2006 | Ota | 701/200 |
| 2006/0119515 A1 | 6/2006 | Smith | 342/450 |
| 2006/0129310 A1 | 6/2006 | Tarrant et al. | 701/201 |
| 2006/0161340 A1 | 7/2006 | Lee | 701/207 |
| 2006/0167598 A1 | 7/2006 | Pennarola | 701/11 |
| 2006/0181447 A1 | 8/2006 | Kuji et al. | 342/32 |
| 2006/0191326 A1 | 8/2006 | Smith et al. | 73/73 |
| 2006/0208924 A1 | 9/2006 | Matalon | 340/933 |
| 2006/0250305 A1 | 11/2006 | Coluzzi et al. | 342/458 |
| 2006/0262014 A1 | 11/2006 | Shemesh et al. | 342/386 |
| 2006/0265664 A1 | 11/2006 | Simons et al. | 715/722 |
| 2006/0276201 A1 | 12/2006 | Dupray | 455/456.1 |
| 2007/0001903 A1 | 1/2007 | Smith et al. | 342/387 |
| 2007/0040734 A1 | 2/2007 | Evers | 342/126 |
| 2007/0060079 A1 | 3/2007 | Nakagawa et al. | 455/131 |
| 2007/0090295 A1 | 4/2007 | Parkinson et al. | 250/349 |
| 2007/0106436 A1 | 5/2007 | Johansson | 701/23 |
| 2007/0109184 A1 | 5/2007 | Shyr et al. | 342/357.06 |
| 2007/0159356 A1 | 7/2007 | Borel et al. | 340/945 |
| 2007/0159378 A1 | 7/2007 | Powers et al. | 342/29 |
| 2007/0182589 A1 | 8/2007 | Tran | 340/961 |
| 2007/0213887 A1 | 9/2007 | Woodings | 701/1 |
| 2007/0222665 A1 | 9/2007 | Koeneman | 342/29 |
| 2007/0250259 A1 | 10/2007 | Dare | 701/201 |
| 2007/0252750 A1 | 11/2007 | Jean et al. | 342/40 |
| 2007/0298786 A1 | 12/2007 | Meyers et al. | 455/431 |
| 2008/0027596 A1 | 1/2008 | Conner et al. | 701/16 |
| 2008/0042880 A1 | 2/2008 | Ramaiah et al. | 340/958 |
| 2008/0042902 A1 | 2/2008 | Brandwood et al. | 342/465 |
| 2008/0062011 A1 | 3/2008 | Butler et al. | 340/961 |
| 2008/0063123 A1 | 3/2008 | De Mey et al. | 375/350 |
| 2008/0068250 A1 | 3/2008 | Brandao et al. | 342/30 |
| 2008/0088508 A1 | 4/2008 | Smith | 342/453 |
| 2008/0106438 A1 | 5/2008 | Clark et al. | 340/972 |
| 2008/0106457 A1 | 5/2008 | Bartolini et al. | 342/40 |
| 2008/0109343 A1 | 5/2008 | Robinson et al. | 705/37 |
| 2008/0117106 A1 | 5/2008 | Sarno et al. | 342/444 |
| 2008/0120032 A1 | 5/2008 | Brandao et al. | 701/300 |
| 2008/0129601 A1 | 6/2008 | Thomas | 342/465 |
| 2008/0132270 A1 | 6/2008 | Basir | 455/550.1 |
| 2008/0137524 A1 | 6/2008 | Anderson et al. | 370/203 |
| 2008/0150784 A1 | 6/2008 | Zhang et al. | 342/30 |
| 2008/0158040 A1 | 7/2008 | Stayton et al. | 342/32 |
| 2008/0158059 A1 | 7/2008 | Bull et al. | 342/387 |
| 2008/0174472 A1 | 7/2008 | Stone et al. | 342/30 |
| 2008/0183344 A1 | 7/2008 | Doyen et al. | 701/9 |

| | | | | | | |
|---|---|---|---|---|---|---|
| 2008/0186224 A1 | 8/2008 | Ichiyanagi et al. | 342/109 | EP | 1125415 B1 | 1/2006 |
| 2008/0186231 A1 | 8/2008 | Aljadeff et al. | 342/387 | EP | 1205732 B1 | 3/2006 |
| 2008/0195309 A1 | 8/2008 | Prinzel, III et al. | 701/208 | EP | 1632787 A1 | 3/2006 |
| 2008/0231494 A1 | 9/2008 | Galati | 342/37 | EP | 1632892 A2 | 3/2006 |
| 2008/0252528 A1 | 10/2008 | Shen et al. | 342/451 | EP | 0953261 B1 | 6/2006 |
| 2008/0266166 A1 | 10/2008 | Schuchman | 342/97 | EP | 1275975 B1 | 6/2006 |
| 2008/0272227 A1 | 11/2008 | Sharpe | 244/3.16 | EP | 1285232 B1 | 6/2006 |
| 2008/0275642 A1 | 11/2008 | Clark et al. | 701/208 | EP | 1672384 A2 | 6/2006 |
| 2008/0294306 A1 | 11/2008 | Huynh et al. | 701/3 | EP | 0987562 B1 | 7/2006 |
| 2008/0297398 A1 | 12/2008 | Kamimura | 342/38 | EP | 1093564 B1 | 11/2006 |
| 2009/0005960 A1 | 1/2009 | Roberts et al. | 701/120 | EP | 1218694 B1 | 11/2006 |
| 2009/0009357 A1 | 1/2009 | Heen et al. | 340/825.09 | EP | 1727094 A2 | 11/2006 |
| 2009/0012660 A1 | 1/2009 | Roberts et al. | 701/3 | EP | 1742170 A1 | 1/2007 |
| 2009/0012661 A1 | 1/2009 | Louis | 701/9 | EP | 1188137 B1 | 2/2007 |
| 2009/0015471 A1 | 1/2009 | Shen et al. | 342/357.15 | EP | 1755356 A1 | 2/2007 |
| 2009/0027270 A1 | 1/2009 | Fisher et al. | 342/387 | EP | 1463002 B1 | 4/2007 |
| 2009/0051570 A1 | 2/2009 | Clark et al. | 340/971 | EP | 1361555 B1 | 5/2007 |
| 2009/0055038 A1 | 2/2009 | Garrec et al. | 701/17 | EP | 1798572 A1 | 6/2007 |
| | | | | EP | 1410364 B1 | 10/2007 |
| | FOREIGN PATENT DOCUMENTS | | | EP | 1843161 A2 | 10/2007 |
| | | | | EP | 1860456 A1 | 11/2007 |
| DE | 4204164 A1 | 8/1993 | | EP | 1884462 A1 | 2/2008 |
| DE | 19751092 A1 | 6/1999 | | EP | 1101385 B1 | 3/2008 |
| DE | 10149006 A1 | 4/2003 | | EP | 1901090 A1 | 3/2008 |
| DE | 202004007747 U1 | 9/2004 | | EP | 0964268 B1 | 4/2008 |
| DE | 202006005089 U1 | 6/2006 | | EP | 1483755 B1 | 4/2008 |
| DE | 102006009121 A1 | 8/2007 | | EP | 1906204 A2 | 4/2008 |
| EP | 0265902 A2 | 5/1988 | | EP | 1912077 A2 | 4/2008 |
| EP | 0346461 A1 | 12/1989 | | EP | 1331490 B1 | 6/2008 |
| EP | 0466239 | 1/1992 | | EP | 1942351 A1 | 7/2008 |
| EP | 0514826 A1 | 11/1992 | | EP | 1327159 B1 | 8/2008 |
| EP | 0550073 A2 | 7/1993 | | EP | 1436641 B1 | 8/2008 |
| EP | 0574009 A3 | 6/1994 | | EP | 1953565 A1 | 8/2008 |
| EP | 0613110 A1 | 8/1994 | | EP | 1483902 B1 | 9/2008 |
| EP | 0613111 A1 | 8/1994 | | EP | 1965219 A1 | 9/2008 |
| EP | 0614092 A1 | 9/1994 | | EP | 1972962 A2 | 9/2008 |
| EP | 0629877 A1 | 12/1994 | | EP | 1975884 A1 | 10/2008 |
| EP | 0355336 B1 | 8/1995 | | EP | 1118011 B1 | 11/2008 |
| EP | 0670566 A2 | 9/1995 | | EP | 1995708 A1 | 11/2008 |
| EP | 0682332 A1 | 11/1995 | | EP | 2000778 A2 | 12/2008 |
| EP | 0505827 B1 | 6/1996 | | EP | 2001004 A2 | 12/2008 |
| EP | 0385600 B1 | 7/1996 | | EP | 2023155 A1 | 2/2009 |
| EP | 0732596 A2 | 9/1996 | | FR | 2708349 A1 | 2/1995 |
| EP | 0487940 B1 | 1/1997 | | FR | 2791778 A1 | 10/2000 |
| EP | 0774148 A1 | 5/1997 | | FR | 2881841 A1 | 8/2006 |
| EP | 0578316 B1 | 4/1998 | | JP | 9-288175 A | 11/1994 |
| EP | 0915349 A1 | 5/1999 | | JP | 6-342061 A | 12/1994 |
| EP | 1022580 A3 | 2/2001 | | JP | 8-146130 A | 5/1996 |
| EP | 1118871 A2 | 7/2001 | | JP | 9-119983 A | 11/1996 |
| EP | 0877997 B1 | 12/2001 | | WO | WO9205456 A1 | 4/1992 |
| EP | 0778470 B1 | 5/2002 | | WO | WO 94/14251 | 6/1994 |
| EP | 1202233 A1 | 5/2002 | | WO | WO9427161 A1 | 11/1994 |
| EP | 0865004 B1 | 7/2002 | | WO | WO9428437 A1 | 12/1994 |
| EP | 1109032 B1 | 3/2003 | | WO | WO9503598 A1 | 2/1995 |
| EP | 1300689 A2 | 4/2003 | | WO | WO9521388 A1 | 8/1995 |
| EP | 1331620 A1 | 7/2003 | | WO | WO9605562 A1 | 2/1996 |
| EP | 1345044 A1 | 9/2003 | | WO | WO9635961 A1 | 11/1996 |
| EP | 1369704 A1 | 12/2003 | | WO | WO9726552 A2 | 7/1997 |
| EP | 1302920 B1 | 2/2004 | | WO | WO9747173 A2 | 12/1997 |
| EP | 1396832 A1 | 3/2004 | | WO | WO9804965 A2 | 2/1998 |
| EP | 1406228 A2 | 4/2004 | | WO | WO9805977 A1 | 2/1998 |
| EP | 1070968 B1 | 5/2004 | | WO | WO9814926 A1 | 4/1998 |
| EP | 1431946 A1 | 6/2004 | | WO | WO9822834 A1 | 5/1998 |
| EP | 1467575 A1 | 10/2004 | | WO | WO9822923 A1 | 5/1998 |
| EP | 1471365 | 10/2004 | | WO | WO9835311 A1 | 8/1998 |
| EP | 0903589 B1 | 11/2004 | | WO | WO9843107 A1 | 10/1998 |
| EP | 1517281 A2 | 3/2005 | | WO | WO9849654 A1 | 11/1998 |
| EP | 1531340 A1 | 5/2005 | | WO | WO9908251 A1 | 2/1999 |
| EP | 0926510 B1 | 8/2005 | | WO | WO9935630 A1 | 7/1999 |
| EP | 1405286 B1 | 9/2005 | | WO | WO9942855 A1 | 8/1999 |
| EP | 1485730 B1 | 9/2005 | | WO | WO9945519 A2 | 9/1999 |
| EP | 1428195 B1 | 10/2005 | | WO | WO 99/50985 | 10/1999 |
| EP | 1603098 A1 | 12/2005 | | WO | WO9950985 | 10/1999 |

| | | |
|---|---|---|
| WO | WO9956144 A1 | 11/1999 |
| WO | WO0023816 A1 | 4/2000 |
| WO | WO0039775 A2 | 7/2000 |
| WO | WO0111389 A1 | 2/2001 |
| WO | WO0133302 A2 | 5/2001 |
| WO | WO0148652 A1 | 7/2001 |
| WO | WO0157550 A1 | 8/2001 |
| WO | WO0159601 A1 | 8/2001 |
| WO | WO0163239 A1 | 8/2001 |
| WO | WO0165276 A1 | 9/2001 |
| WO | WO 0186319 | 11/2001 |
| WO | WO0186319 | 11/2001 |
| WO | WO0194969 A2 | 12/2001 |
| WO | WO0205245 A2 | 1/2002 |
| WO | WO0208784 A1 | 1/2002 |
| WO | WO0215151 A1 | 2/2002 |
| WO | WO0227275 A2 | 4/2002 |
| WO | WO02054103 A2 | 7/2002 |
| WO | WO02059838 A2 | 8/2002 |
| WO | WO02066288 A1 | 8/2002 |
| WO | WO02069300 A1 | 9/2002 |
| WO | WO02075667 A1 | 9/2002 |
| WO | WO02091312 A2 | 11/2002 |
| WO | WO02095709 A2 | 11/2002 |
| WO | WO02099769 | 12/2002 |
| WO | WO03013010 A1 | 2/2003 |
| WO | WO03016937 A1 | 2/2003 |
| WO | WO03023439 A2 | 3/2003 |
| WO | WO03027934 A1 | 4/2003 |
| WO | WO03054830 A2 | 7/2003 |
| WO | WO03056495 A1 | 7/2003 |
| WO | WO03060855 A1 | 7/2003 |
| WO | WO03067281 A1 | 8/2003 |
| WO | WO03079136 A2 | 9/2003 |
| WO | WO03081560 A1 | 10/2003 |
| WO | WO03093775 A2 | 11/2003 |
| WO | WO03096282 A1 | 11/2003 |
| WO | WO03098576 A1 | 11/2003 |
| WO | WO03107299 A2 | 12/2003 |
| WO | WO2004042418 A1 | 5/2004 |
| WO | WO2004068162 A2 | 8/2004 |
| WO | WO2004109317 A2 | 12/2004 |
| WO | WO2004114252 A1 | 12/2004 |
| WO | WO2005038478 A2 | 4/2005 |
| WO | WO2005052887 A1 | 6/2005 |
| WO | WO2005081012 A1 | 9/2005 |
| WO | WO2005081630 A2 | 9/2005 |
| WO | WO2005114613 A1 | 12/2005 |
| WO | WO2005121701 A2 | 12/2005 |
| WO | WO2005017555 A2 | 5/2006 |
| WO | WO2006070207 A1 | 7/2006 |
| WO | WO2006079165 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2006088554 A1 | 9/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

Need for Accurate Traffic Data in Pavement Management, John F. Kennedy International Airport Case Studt, Keegan, Handojo, Rada, Mactex Engineering and Consulting, Inc, 2004 FAA Worldwide Airport Technology Transfer Conference, Apr. 2004.

PCL system with illuminator of opportunity, Huaiying tan, Min ren, Bo lie, Jinning Song, Beijing Radar Instiitute, IEEE 0-7803-9582-4/06, Apr. 2006.

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE The International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12. 675065 , Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *ERA a.s.* (Czech Republic) Radek Plsek Technical Univ. of Pardubice (Czech Republic).

World Airport Week, "Sharing Makes the Airport Go Round" Jan. 21, 1997, p. 1.

Huaiying Tan et al. *PCL System With Illuminator of Opportunity* Proceedings of 2006 CIE International Conference on Radar, vol. 1,Oct. 16, 2006.

Griffiths H D et al., *Denial of Bistatic Hosting By Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, Radar, 2006, CIE '06. International Conference on, IEEE, PI, Oct. 1, 2006.

Terminal, Landing Fees Increase, Dianne Gouliquer, Northern Ontario Business, Sudbury, Apr. 1, 2001, vol. 21, Issue 6, p. 24.

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X —Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Form B- Proposal Summary, NASA SBIR 02-1 Solicitation, http://sbir. nasa.qov/SBIR/abstracts/02/sbir/phase1/SBIR-02-1-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.

"UK ADS-B in radar environment" (Mark Watson) http://www.eurocontrol.int/cascade/gallery/content/public/documents/Presentations/Session%20%202%20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

Traffic Alert System Technical Design Summary, Final Report, Apr. 1994 (Baldwin et al.).

GPS Relative Accuracy for Collision Avoidance, Institute of Navigation Technical Meeting, Jan. 1997 (Rudel) et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers To Mode S code", R.D. Grappel, M.I.T. Lincoln Laboratory, 1991.

"ADSE and Multilateration Mode-S Data Fusion for Location and Identification on Airport Surface", J.G. Herrero J.A. Portas, F.J. Rodriguez, (*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) For Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

ASA MASPS—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.

ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.

ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommittee on Feb. 12, 1998. David Plavin.
Draft Proposal for the Amendment of the Sub-Cap on Off-Peak Takeoff and Landing Charges At Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.
Albany International Airport Pavement Management System, Albany, New York, Albany International Airport GIS-Based Pavement and Facilities Management, Fall, 2002.
Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.
Micropaver, Dr. M.Y. Shahin, CECER-CFF Champaign, IL May 2, 2005.
Raytheon Systems Limited Launches A Unique Solution for ADS-B,. Jan. 19, 2005, Raytheon Corp. http://www.raytheon.co.uk/highlights/ATMS.html.
Raytheon Systems Limited'S ADS-B Solution Prized by International Air Traffic Authorities, Feb. 2, 2005, http://www.raytheon.co.uk/news_room/news/press_02022005.pdf.
Boeing Subsidiary and Megadata Announce Joint Marketing Agreement, Press Release, Aug. 7, 2003.
Federal Airways & Airspace, Inc. Because Accuracy Matters, Feb. 2003, Jan. 2002.
VDL4 TM Alignment With DO-242A (RTCA ADS-B MASPS) WG51/SG2, NASA, Sep. 2003.
Method to Provide System-Wide ADS-B Back-Up, Validation, and Security, A. Smith et al. 25$^{th}$ AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.
*Analysis of ADS-B, ASDE-3 and Multilateration Surveillance Performance*—NASA Atlanta Demonstration Presented at the AIAA 17th Annual Digital Avionics Systems Conference in Oct. 1998.
*Application of ADS-B for Airport Surface Surveillance*, Daniel Hicok, Derrick Lee IEEE AIAA 17$^{th}$ Annual Digital Avionics Conference, 1998.
*Atlanta Hartsfield International Airport—Results of FAA Trials to Accurately Locate/Identify Aircraft on the Airport Movement Area*, IEEE Plans, Atlanta, GA, Apr. 1996.
*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke Radar, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148$^{th}$ Meeting of the Acoustical Society of America, http://pcfite.ing.uniroma1.it/upload/research/4psp711079482021710.pdf Nov. 2004.
*Cel-Loc How We Do it, Technology Overview*, http://www.cell-loc.com/how_tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25$^{th}$ AIAA/IEEE Digital Avionics Systems Conference, Oct. 15, 2006.
Damarel Systems International, Ltd, Travel Automation Specialists, © 2004, www.dameral.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transportation.htm.
*The Twilight Zone, Can Wide-Area Multilateration Systems Become A Nightmare for MSSR Producers?* Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, Siemens, Feb. 10, 2006.
*Required Navigation Performance (RNP) and Area Navigation (RNAV)*, Boeing, Aug. 2000.
*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Airport Pavement Management Systems: An Appraisal of Existing Methodologies, Michel Gendreau and Patrrick Soriano;Pergamon Transn Res. A, vol. 32, No. 3, pp. 187-214, 1998.
*Components of a Pavement Maintenance Management System*, Mohamed Y. Shahin, U.S. Army Construction Engineering Research Laboratory, Transportaiton Research Record 791, pp. 31-39, 1980.
Protest Letter dated May 16, 2002 from Otto M. Wildensteiner, U.S. Department of Transportation, Washington, DC.
"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, 81998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating an Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

DEPLOYABLE PASSIVE BROADBAND AIRCRAFT TRACKING

CROSS-REFERENCE TO RELATED APPLICATIONS

This application is a Continuation-In-Part of U.S. patent application Ser. No. 11/492,711, filed Jul. 25, 2006, and incorporated herein by reference; This application is a Continuation-In-Part of U.S. patent application Ser. No. 11/429,926, filed on May 8, 2006, and incorporated herein by reference; This application is a Continuation-In-Part of U.S. patent application Ser. No. 11/343,079, filed on Jan. 30, 2006, and incorporated herein by reference; This application is also a Continuation-In-Part of U.S. patent application Ser. No. 11/342,289 filed Jan. 28, 2006 and incorporated herein by reference; This application is a Continuation-In-Part of U.S. patent application Ser. No. 11/209,030, filed on Aug. 22, 2005, and incorporated herein by reference; This application is a Continuation-In-Part of U.S. patent application Ser. No. 11/257,416, filed on Oct. 24, 2005, and incorporated herein by reference; This application is a Continuation-In-Part of U.S. patent application Ser. No. 11/203,823 filed Aug. 15, 2005 and incorporated herein by reference; This application is a Continuation-In-Part of U.S. patent application Ser. No. 11/145,170 filed on Jun. 6, 2006 and incorporated herein by reference; This application is a Continuation-In-Part of U.S. patent application Ser. No. 10/743,042 filed Dec. 23, 2003 and incorporated herein by reference; application Ser. No. 10/743,042 is a Continuation-In-Part of U.S. patent application Ser. No. 10/638,524 filed Aug. 12, 2003 and incorporated herein by reference; application Ser. No. 10/638,524 is a Continuation of U.S. patent application Ser. No. 09/516,215 filed Feb. 29, 2000 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 and incorporated herein by reference. Application Ser. No. 10/743,042 is a Non Prov. of Provisional U.S. Patent Application Ser. No. 60/440,618 filed Jan. 17, 2003 and incorporated herein by reference; This application is also claims priority from Provisional U.S. Patent No. 60/851,618, filed on Oct. 12, 2006 and incorporated herein by reference.

FIELD OF THE INVENTION

The present invention relates to the field of aircraft and ground vehicle tracking and surveillance. In particular, the present invention is directed towards techniques for using multilateration and bilateration as a backup and validation for ADS-B aircraft tracking and as a portable or deployable tracking system for military and security purposes.

BACKGROUND OF THE INVENTION

Despite ongoing concerns about security, demand for air travel is forecast to continue at an extraordinary rate in both mature and developing markets. In the USA, the NGATS program forecasts that passenger numbers will increase by up to 140% over the next 20 years with aircraft movements increasing up to three-fold, depending on the mix of small and larger aircraft. See, e.g., *Next Generation Air Transport System Integrated Plan*, JPDO, December 2004, incorporated herein by reference. In Europe, the SESAR Consortium predicts similar challenges, with the number of flights predicted to increase by 150% over the same period. See, e.g., *SESAR Definition Phase Deliverable for Air Transport Framework—The Current Situation*, SESAR Consortium 2006, incorporated herein by reference. In developing markets such as China, Asia-Pacific and South America the growth is expected to be even greater. See, e.g., *Boeing Current Market Outlook* 2006, incorporated herein by reference.

From an ATM perspective, the result will be around twice as many commercial aircraft travelling a more complex network of point-to-point and hub-and-spoke routes to an increasing number of airports. In turn, this will require reduced separation and flexible route planning, which will place significant pressure on improved performance from ATC systems and surveillance technologies.

There is general agreement that Automatic Dependent Surveillance—Broadcast (ADS-B) will play a significant role at the core of future civil aviation surveillance infrastructure and, following some years of pilot programs (including CAPSTONE in USA, the Bundaberg Trials in Australia, and CASCADE/CRISTAL in Europe) and discussions about standards and technologies, major ADS-B deployment programs are now in progress, including the Australian Upper Airspace Program and the FAA's NAS-Wide ADS-B Program.

ADS-B uses new on-board avionics subsystems which incorporate GNSS positioning systems (e.g., GPS or alternatives such as Europe's Galileo), an interface to flight management systems, and a transponder to broadcast aircraft position and supplementary information on a regular basis. This approach offers a number of benefits, especially when compared to traditional radar alternatives:

The ground infrastructure required to determine aircraft position is relatively cheap, consisting of radio receivers able to detect and decode the messages within line-of-sight of the transmitting aircraft and up to 250 nm distant from the aircraft.

The resulting data is generally extremely accurate (potentially within tens of meters), of high integrity, and with an update rate far exceeding that obtained from radar.

ADS-B architecture is two-way, which allows aircraft to receive position and other information directly from other aircraft or from ground based (TIS-B and FIS-B) infrastructure, to provide rich cockpit information and enable new cockpit-based applications.

These benefits present an overwhelmingly compelling case for ADS-B deployment, however there are a number of challenges, which must be addressed for ADS-B to be adopted as a primary or sole surveillance solution in order that the benefits can be completely realized.

Firstly, ADS-B requires new equipment on-board each aircraft and, while incremental costs of ADS-B equipage for new aircraft is small, the costs to retrofit existing aircraft, including certification costs and the opportunity costs of the associated operational downtime, are significant. As a result, even with new rules and mandates being introduced, it will be many years until equipage levels are such that ADS-B can be used as a platform for consistent and universal aircraft separation. See, e.g., *Paper to RTCA Spring Forum—Mitre Corporation*, May 2005, incorporated herein by reference. The FAA ADS-B program assumes that, even with rulemaking support, it will be 2020 until all large commercial aircraft are equipped.

Secondly, the transition from radar to ADS-B will need to address issues of data integrity and validation before ANSP's can undertake safety-critical separation services using position information derived no longer from their own radar infrastructure but from information provided directly from the aircraft avionics. It seems likely that, even if the safety case supports ADS-B-only surveillance, issues of governance and responsibility will require ANSP's to establish an independent means of backup and validation for ADS-B and the associated business case will be significantly impacted if this backup system must rely only on ongoing use of radar infrastructure. Encrypting ADS-B has been proposed as a means to validate ADS-B, but this technique does not support backup surveillance. See, e.g., *Digital Avionics Systems Conference (DASC)*—Sensis, October 2006, incorporated herein by reference.

Thirdly, surveillance based on the broadcast of self-reported aircraft position raises security issues, both in terms of the ease with which aircraft can be tracked from the ground by almost anyone, using low-cost and readily available ADS-B decoding units, and also by the potential for an aircraft to knowingly mislead a surveillance system by spoofing its position information and appearing to be in a position other than the position at which it is actually located. In May 2006, the potential vulnerabilities to spoofing were described in a letter from the Australian Civil Aviation Authority's former Chairman to the Australian Government's Minister for Transport and Regional Services, which highlighted the potential for malicious or capricious actions, stating that "any electronics boffin, using a second-hand or 'borrowed' transponder from a small GA aircraft connected to a $5 data lead, a $5 aerial and a laptop computer, can create ten, twenty or even fifty false aircraft on an air traffic controller's screen." See: *Open letter from Mr Dick Smith to Australian Minister for Transport and Regional Services*—May 2006 6, incorporated herein by reference Finally, the introduction of ADS-B surveillance will require the finalization and global adoption of a significant new body of associated standards for both aircraft and ground domains. See, e.g., *Reference Safety, Performance and Interoperability Requirements Document for ADS-B-NRA Application*—ED 126 Draft. EUROCAE, August 2006, incorporated herein by reference.

It can be argued that multilateration techniques can be purposefully, economically, and effectively integrated into an ADS-B surveillance infrastructure to mitigate these issues and to enable a faster, more comprehensive, and more cost-effective ADS-B implementation.

In doing so, the term "Extended ADS" (ADS-X) is sometimes used to describe this integrated approach, as it avoids the traditional and, unhelpful tendency to compare ADS-B and multilateration techniques and the implication that we are somehow choosing between the two technologies.

Multilateration systems use triangulation techniques to determine the source of transponder emissions by analyzing the time difference of arrival (TDOA) of those signals at a network of receiving ground stations with three or four stations required to receive each signal in order for the central processor to determine a triangulation outcome.

These systems are well-proven around the world in Advanced Surface Movement and Ground Control Systems (A-SMGCS) applications in airports including Copenhagen, Prague, Madrid, London, Paris, Atlanta and St Louis and they have also been successfully deployed as ground-based height monitoring units to support RVSM implementation by verifying the performance of barometric altimeters in dense airspace.

A recent report for Eurocontrol on Wide Area Multilateration (WAM) concludes that "Where coverage exists a WAM system will generally outperform MSSR for accuracy" and, with respect to costs found that "The hardware costs of a WAM system are (very roughly) around 50% of those of an SSR system" and "The maintenance cost of WAM systems will be much lower than MSSR as there are no rotating mechanical parts. A 6 monthly maintenance check at each site to maintain ancillary equipment such as UPS systems may be required; otherwise there is very little to do." See, *Wide Area Multilateration, Report on EATMP TRS* 131/04, Eurocontrol 2005, incorporated herein by reference.

As a result, multilateration is seen as a cost-effective and high performance solution for terminal area and en-route surveillance in countries as diverse as Taiwan, Mongolia, the Czech Republic and Australia.

Furthermore, the ground stations of all commercially proven multilateration systems are also full-featured, standards-compliant ADS-B ground stations, which means that such a system is able to not only receive and decode self-reported position information, but can also triangulate on the source of the message to derive an independent position report for the same aircraft. This presents a number of opportunities in addressing ADS-B implementation challenges.

Triangulation or multilateration systems using time difference of arrival (TDOA) processing are used to track aircraft in local, regional and wide areas. These systems generally need pulse transmissions from the aircraft, which have sufficiently fast rise times in order to make a consistent time reference on the signal.

Pulse transmission systems, having sufficiently fast rise times are generally higher frequency signals, L-band or above (generally higher than 900 MHz), with sufficient bandwidth to provide the fast rise time.

Signals with sufficient frequency and bandwidth include secondary surveillance radar systems (SSR), including Mode A, Mode C, Mode S, and ADS-B.

Companies fielding triangulation systems for SSR include Sensis Corporation and ERA Systems Corporation.

While SSR signals are used for multilateration on the 1090 MHz frequency, there are others that use TDOA processing of other aircraft signals on different frequencies.

One of these is the VERA-E system manufactured by ERA Systems Corporation, assignee of the present application, and illustrated in FIGS. 1 through 4. This system is used to track aircraft over wide areas using broadband methods. Essentially the broadband aspect is achieved by using a series of antennas and receiver systems interconnected as illustrated in FIG. 4. Each sub system handles a subset of frequencies in an overall range of 1 GHz to 20 GHz. The system has the following features and capabilities:

Covertness—electronic and physical

Exploitation of electronic warfare countermeasures

Long range of detection (radio horizon is main limitation)

Tracking and Electronic Intelligence (ELINT) providing covert IFF capability

Excellent Tracking Accuracy

Coverage of both land and surface targets

Cost effective systems acquisition and life cycle cost.

FIG. 1 illustrates a deployable Broadband Receiver Unit Manufactured by ERA a.s. FIG. 2 is a close-up view of a VERA E Antenna. FIG. 3 shows a VERA E receiver unit shown on a transport for deployment. FIG. 4 illustrates VERA E architecture. Referring to FIG. 4, signals may be input from a plurality of antennas 405 comprising antennas 410, 415, 420, 430, and 425. Antenna 410 may comprise an FE SIF antenna whose input is fed to a SIF/TACAN (Selective Identification Feature/Tactical Air Navigation) receiver 445. The inputs from antennas 415, 420, 425, 430, and 435 are fed to radar band receivers 450 and 455.

The output of SIF/TACAN receiver 445 and the outputs of radar band receivers 450 and 455 are fed to a video switch and interface 460. The output of video switch and interface 460 and radar band receiver 450 is fed to the CPS system 485. Control and commands from the CPS system 490 are fed to datalink subsystem 465, which in turn comprises a plurality of data links 470, 475, and 480. The output of data link subsystem 465 in turn controls video switch and interface 460. Control and commands from CPS 490 also control radar band receivers 450 and 455 along with video switch interface 460 and SIF/TACAN receiver 445.

SUMMARY OF THE INVENTION

In a first, preferred embodiment of the present invention, integrated tracking is provided using passive broadband. The invention takes the system for deployable passive broadband detection and extends it by incorporating the capability to decode position for ADS-B, SSR multilateration, and broadband multilateration.

In this embodiment the aircraft transmits a signal, which is received at a minimum of three stations. The signals include all pulse and high bandwidth signals emanating from the aircraft including but not limited to UAT, DME, TACAN, SSR, Mode S, ADS-B, Pulse Radar, Weather Radar, Communications, and Military Radar.

It is assumed that ADS-B is transmitted by the aircraft and is received by at least one ground station. All ground stations receive all other transmissions be they UAT, DME, TACAN, SSR, Mode S, ADS-B, Pulse Radar, Weather Radar, Communications, or Military Radar.

The comparator compares the ADS-B reported position with a line of precision or a triangulated position from any high frequency signal emanating from the aircraft be it UAT, DME, TACAN, SSR, Mode S, ADS-B, Pulse Radar, Weather Radar, Communications, or Military Radar, and provides the following information to the user:

1) ADS-B self reported position

2) Validated position and identification based on transponder/SSR information

3) Validated position and identification, if available, from all other high frequency signals 4) Information about the validity and integrity of the data, especially the ADS-B self-reported position.

Therefore, the system is capable of tracking aircraft whether or not they have ADS-B, operating transponders, or other high frequency avionics devices.

In a second embodiment, validation of a self-reported position is provided. The invention takes the system for deployable passive broadband detection and extends it by incorporating the capability to decode self-reported position for ADS-B, and compare it to line of calculated position, or line of precision, derived from multilateration techniques applied to various signals received from the aircraft.

In this embodiment the aircraft 100 emits an ADS-B position report along with associated quality and integrity information (NIC/NAC/SIL) 110, 120 and this signal is received at one or more of the stations and is decoded and made available for onward processing to the ATC system 140.

Simultaneously, the same signal and/or other signals emitted by the aircraft are received at a number of stations and a position, or line of precision, is calculated using multilateration techniques. Equivalent measures of data quality and integrity are derived for this information based on the known geometry of the stations and the number of receiving stations, amongst other factors.

Data from the two sources is compared and the "Figure Of Merit" (FOM) for the ADS-B self-reported position is adjusted to reflect the additional information now available to assess the report validity. Optionally an alert may also be raised.

In a third embodiment, independent surveillance position determination and validation of a self-reported ADS-B position are provided for a target under surveillance. The invention uses passive range and passive bearing or Angle of Arrival measurement techniques to determine an independent surveillance position for targets under surveillance and compares the self-reported ADS-B position to the independent surveillance position.

In this third embodiment the aircraft emits an ADS-B position report along with associated quality and integrity information (NIC/NAC/SIL) and this signal is received at one or more of the receivers and is decoded and made available for onward processing to the ATC system.

Simultaneously, the same signal, and/or other signals emitted by the aircraft, are received at a one or more receivers and a independent surveillance position is calculated using passive range and Angle of Arrival measurement techniques. Equivalent measures of surveillance data quality and integrity are derived for independent surveillance position information based on the known geometry of the stations and the number of receiving stations, range error, and angle error, amongst other factors.

The self-reported ADS-B position and independent surveillance position are compared and the "Figure Of Merit" (FOM) for the self-reported ADS-B position is adjusted to reflect the additional information now available to assess the report validity. Optionally an alert may also be raised.

In this third embodiment, the system is implemented as a ground fixed system with one or more receivers or a mobile system with one receiver that is installed on an aircraft or ground vehicle. Vehicles are provided a means to independently determine position and validate ADS-B position reports transmitted by other vehicles.

DETAILED DESCRIPTION OF THE INVENTION

As multilateration techniques can be applied to existing (Mode A, Mode C, Mode S) transponder signals, the network of ground stations is able to determine the position of aircraft without the need for new avionics. This allows ANSPs to deploy the next generation, low cost technologies without the need for a contentious early mandate for equipment retrofit while still potentially avoiding the need to replace SSR systems.

Figure 1:
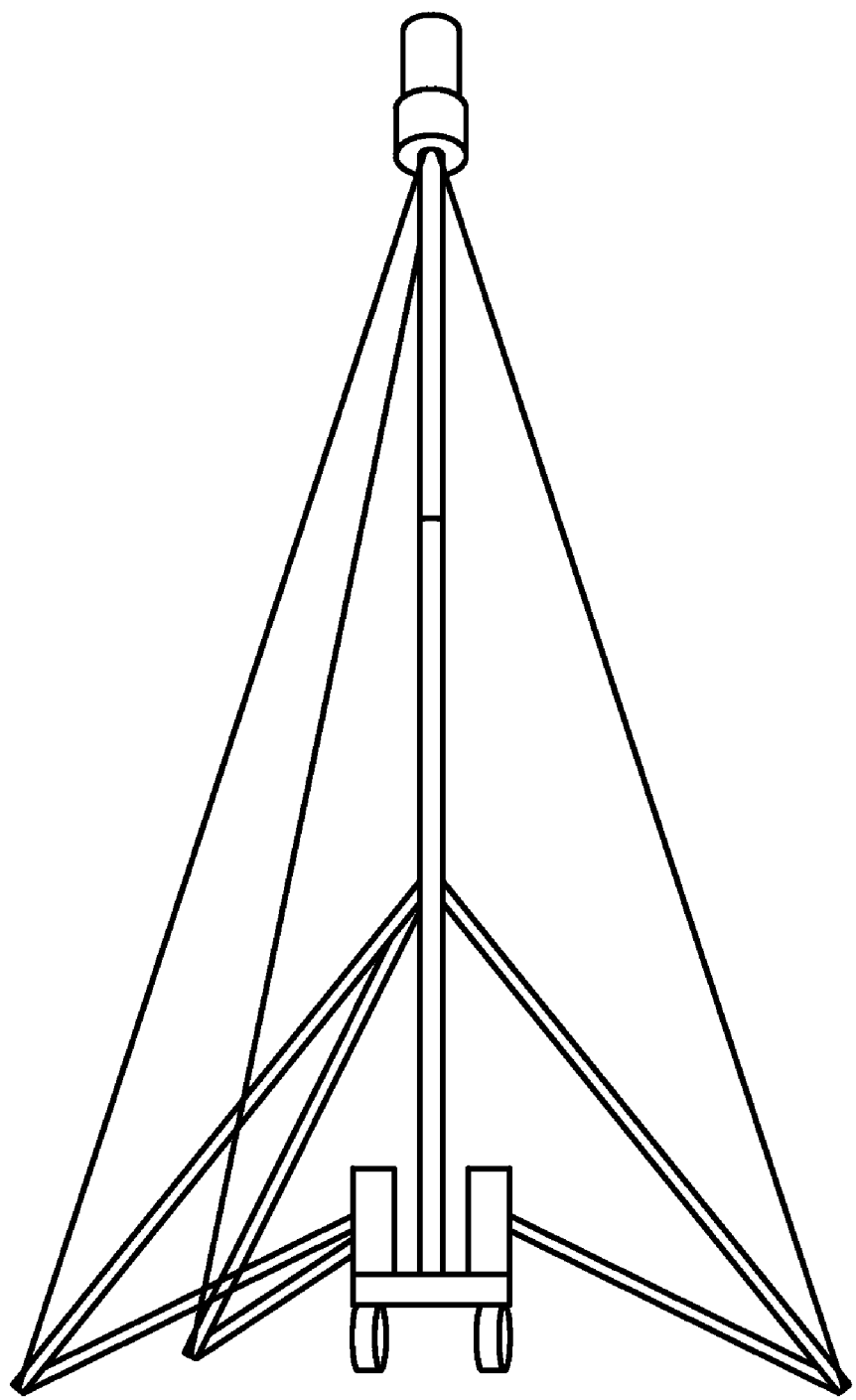
FIG. 1 shows a deployable broadband receiver unit manufactured by ERA Systems Corporation.
Figure 2:
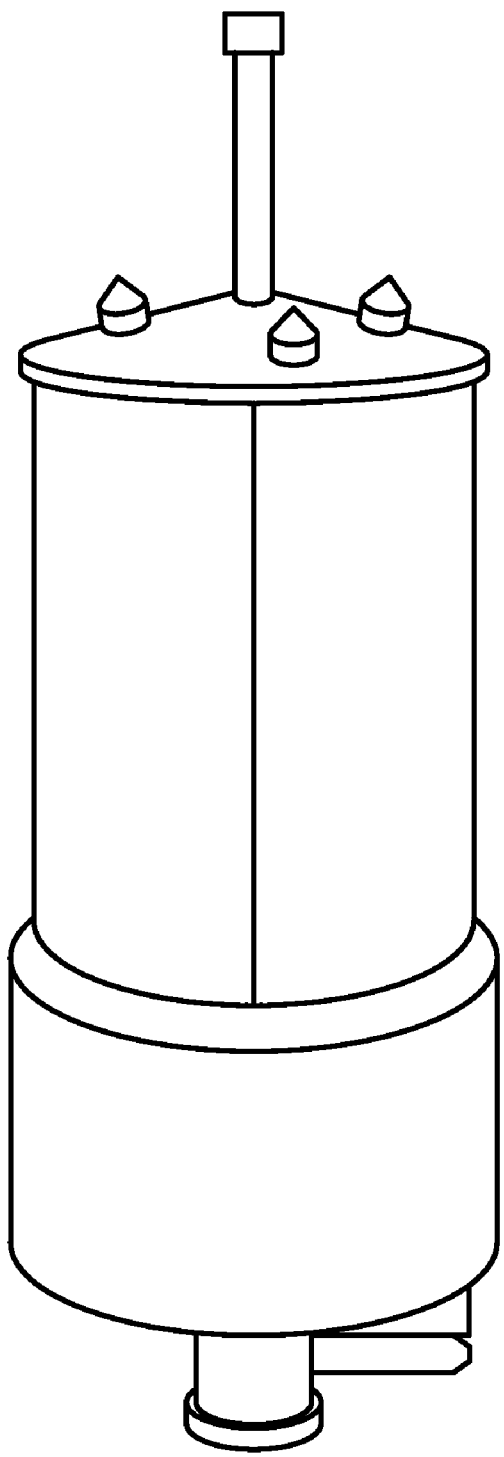
FIG. 2 is a close-up of a VERA E antenna.
Figure 3:
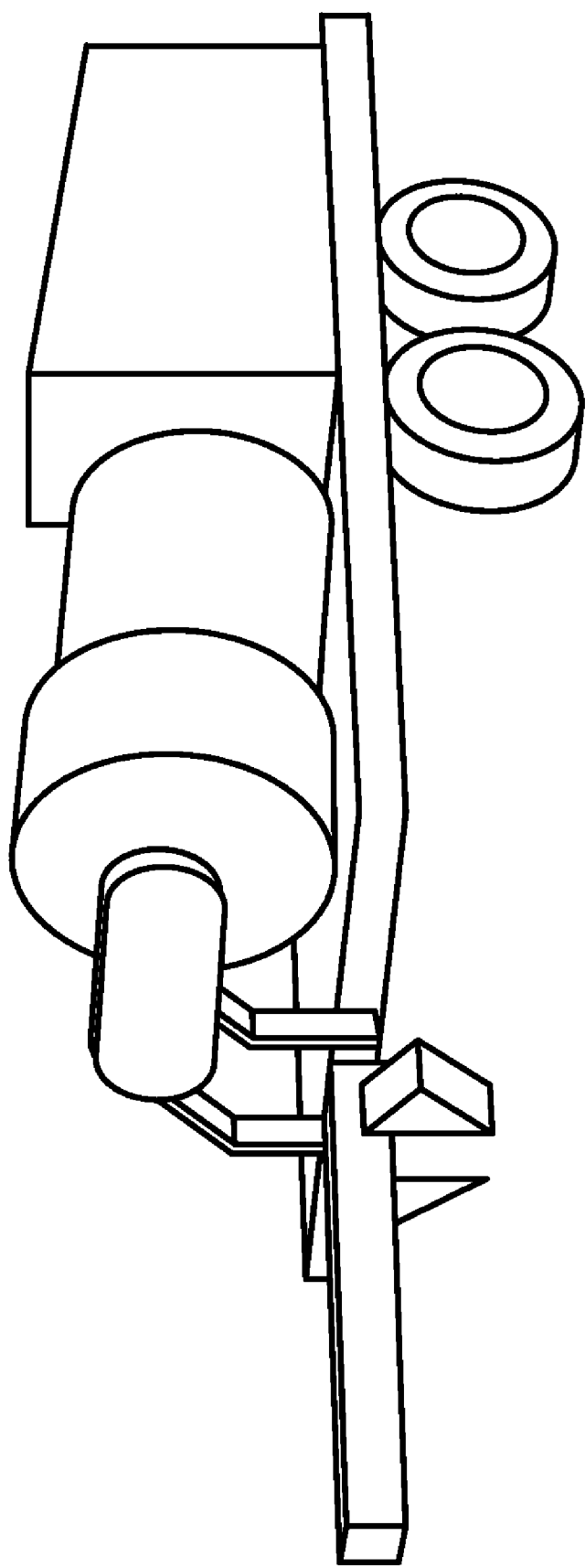
FIG. 3 shows a VERA E receiver unit on transport for deployment.
Figure 4:
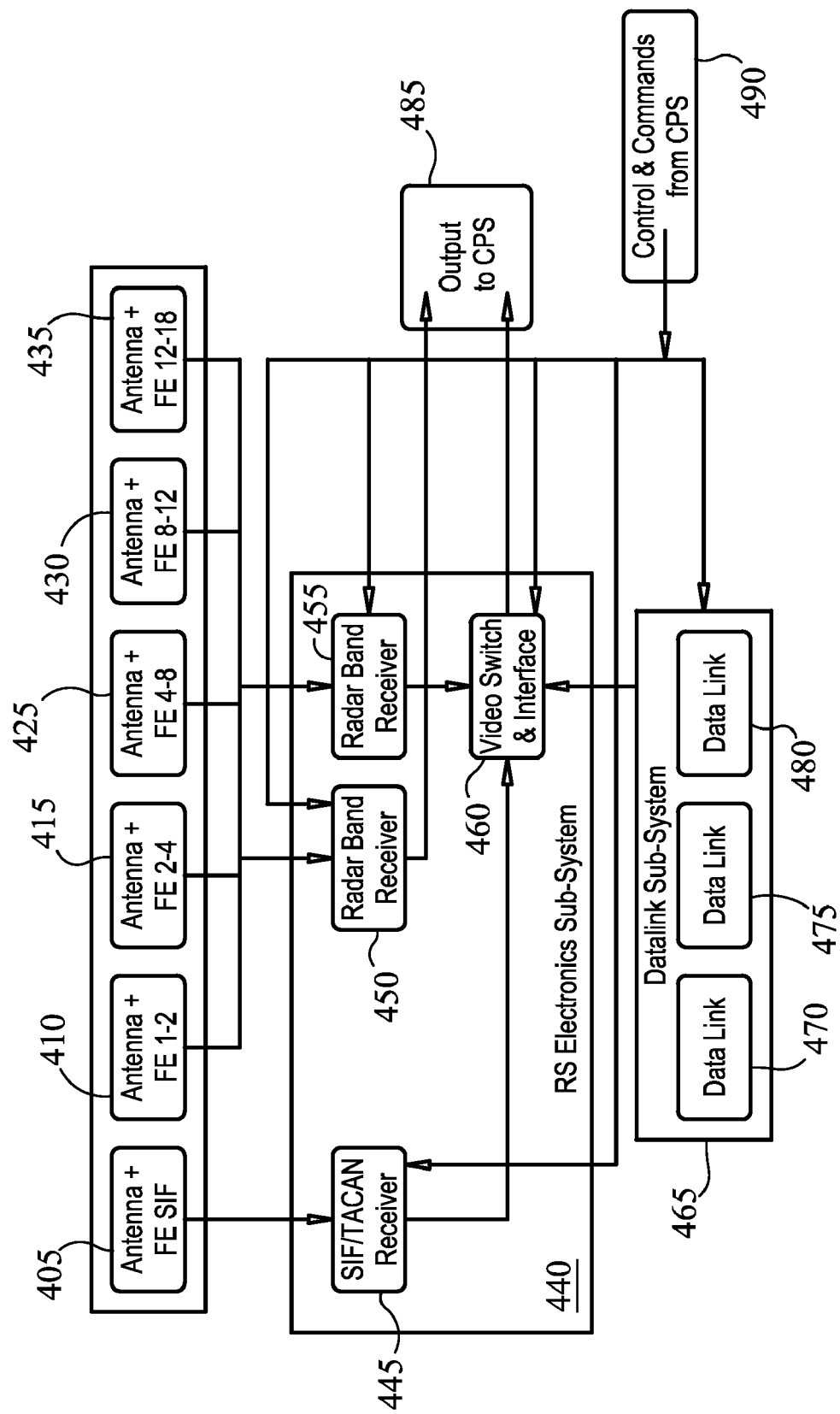
FIG. 4 is a block diagram illustrating VERA E architecture.
Figure 5:
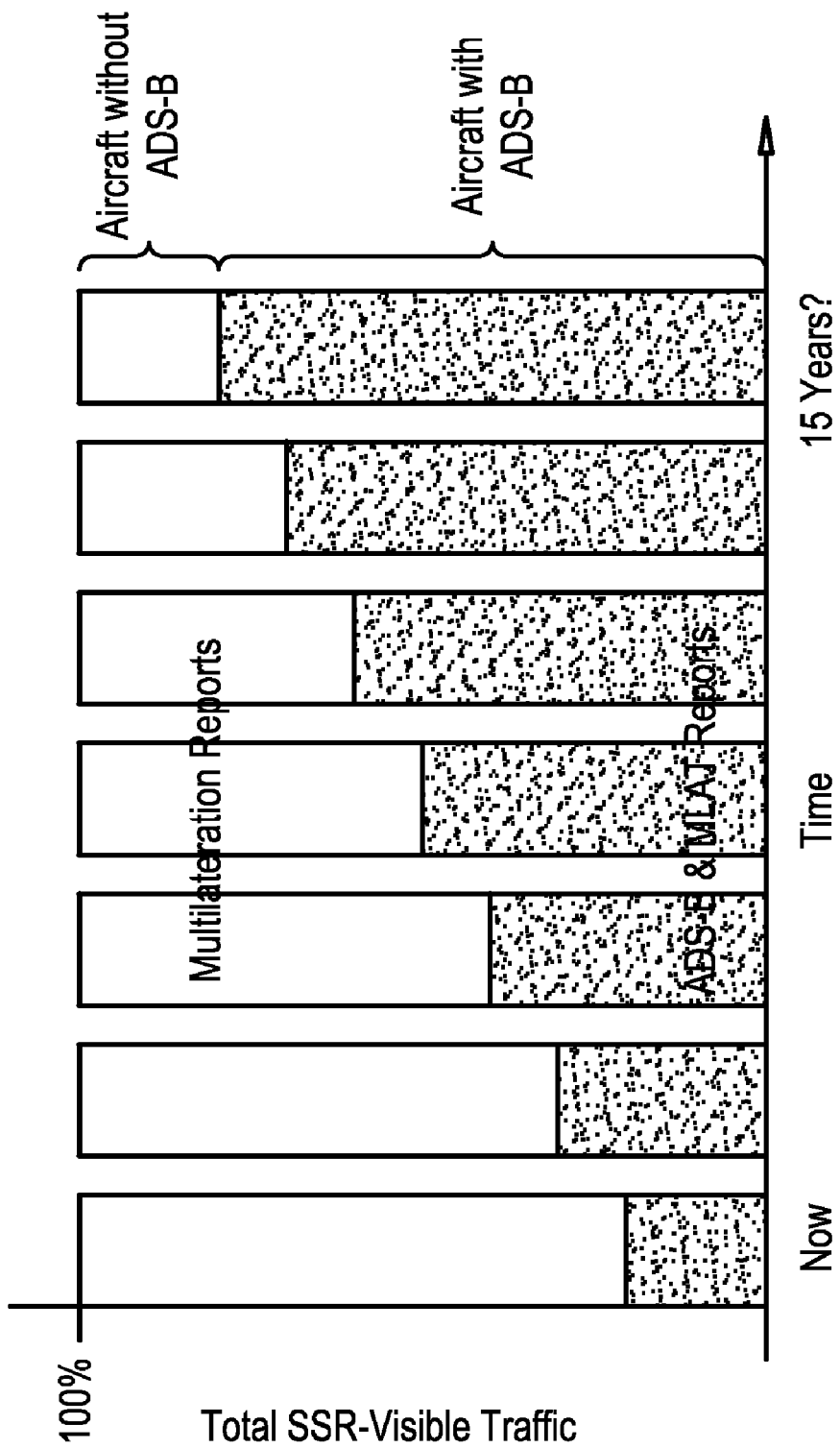
FIG. 5 is a graph indicating coverage of "SSR-visible" aircraft (i.e., Aircraft with operational transponders) in an ADS-X network, and how the network provides SSR-equivalent coverage independent of the speed of the ADS-B transition.

FIG. 5 is a graph indicating coverage of "SSR-visible" aircraft (i.e., aircraft with operational transponders) in an ADS-X network, and how the network provides SSR-equivalent coverage independent of the speed of the ADS-B transition. As illustrated in this graph, at the present time, aircraft with ADS-B equipment comprise a minority of aircraft in service, perhaps around 20%. Over the next 15 years, more and more aircraft will be provided with ADS-B equipment as illustrated in this projection. However, even 15 years from implementation, a significant minority (around 20%) are projected to not have ADS-B equipment installed, unless such equipment is mandated by the FAA or other government agency. Thus, relying upon ADS-B alone for aircraft tracking may not be safe, practical, or feasible. Multilateration provides a means of filling in these gaps by tracking non-ADS-B equipped aircraft.

The second ADS-B implementation challenge, i.e., the need for independent backup and validation of ADS-B self-reported position, is also addressed by the inclusion of multilateration capability in the ADS-B network, as each ADS-B position report is validated in real-time by TDOA triangulation. As an analogy, this is similar to independently comparing the return address shown at the top of a letter with the postmark on the envelope containing the message to assess the validity of that message.

The FAA, in an industry briefing, has both confirmed the need for a backup and validation system for ADS-B and has identified and short listed three candidate strategies to address this requirement. See, e.g., *FAA Surveillance and Broadcast Services Industry Day 2—August* 2006, incorporated herein by reference. The first candidate strategy relies on the continued use of a (reduced) SSR (Secondary Surveillance Radar) network, which is likely to have a significant impact on the economics of the overall program. The intent of ADS-B was to supplant or replace the aging SSR system presently in use. Maintaining the existing SSR system in tandem with ADS-B does not achieve any cost savings, and in fact, merely adds additional costs and complexity to the system.

The second and third strategies enumerated by the FAA are both based on the use of multilateration as the backup technique, with the two strategies differentiated by the inclusion of active interrogation for terminal areas in strategy three.

It is clear that the backup and validation system will not only mitigate the risk of accidentally erroneous self-reported position, but will also address the potential for deliberate spoofing of aircraft position, as the independently-derived multilateration solution will be extremely difficult to spoof without actually emitting a signal from the location in question. ADS-B relies upon position self-reporting, whereas multilateration indicates the actual position of a transmitter.

While there are obvious benefits for the inclusion of multilateration techniques in a next generation ADS-X surveillance solution, there are some challenges and implications to this approach.

This first such implication is that the need for several sensors to receive a signal implies that multilateration functionality requires more ground stations than ADS-B alone. In a simplistic example, a single ADS-B station could be conceived to cover a surveillance area at least equivalent to one secondary radar. A multilateration solution would require four or more stations to achieve the same outcome. This issue can become a significant economic driver if the availability and costs of suitable ground station sites is high and a very conservative approach is taken with the number of sensors. See, e.g., *Wide area multilateration replacing en route radars: not for Australia*—Greg Dunstone, Airservices Australia to ICAO ADS-B Task Force, New Delhi 2006, incorporated herein by reference.

While the need for additional ground stations is real, the costs may generally be only incremental to most ADS-B solutions and remain significantly below the equivalent costs for an SSR, and can be readily justified by the advantages described above.

The cost of ADS-X ground stations is low, even compared to ADS-B stations, as much of the processing is offloaded to central servers. In many applications suitable developed locations for ground stations can be found from existing aviation facilities (airports, navigation aid sites, communication sites, and the like) and from other suitable existing infrastructure such as mobile phone towers and other infrastructure. The low cost of ground stations allows significant levels of redundancy to be built into a network, which can increase the available selection of suitable sites as each site does not require extremely high levels of power and communications resilience.

Furthermore, any operational ADS-B solution would require redundant receiver configuration, which decreases the differential between the ADS-B and ADS-X sensor requirements. It may be possible, for certain applications, to design solutions where large ADS-B surveillance zones are enhanced by a core area, which incorporates multilateration backup and validation.

Figure 6:
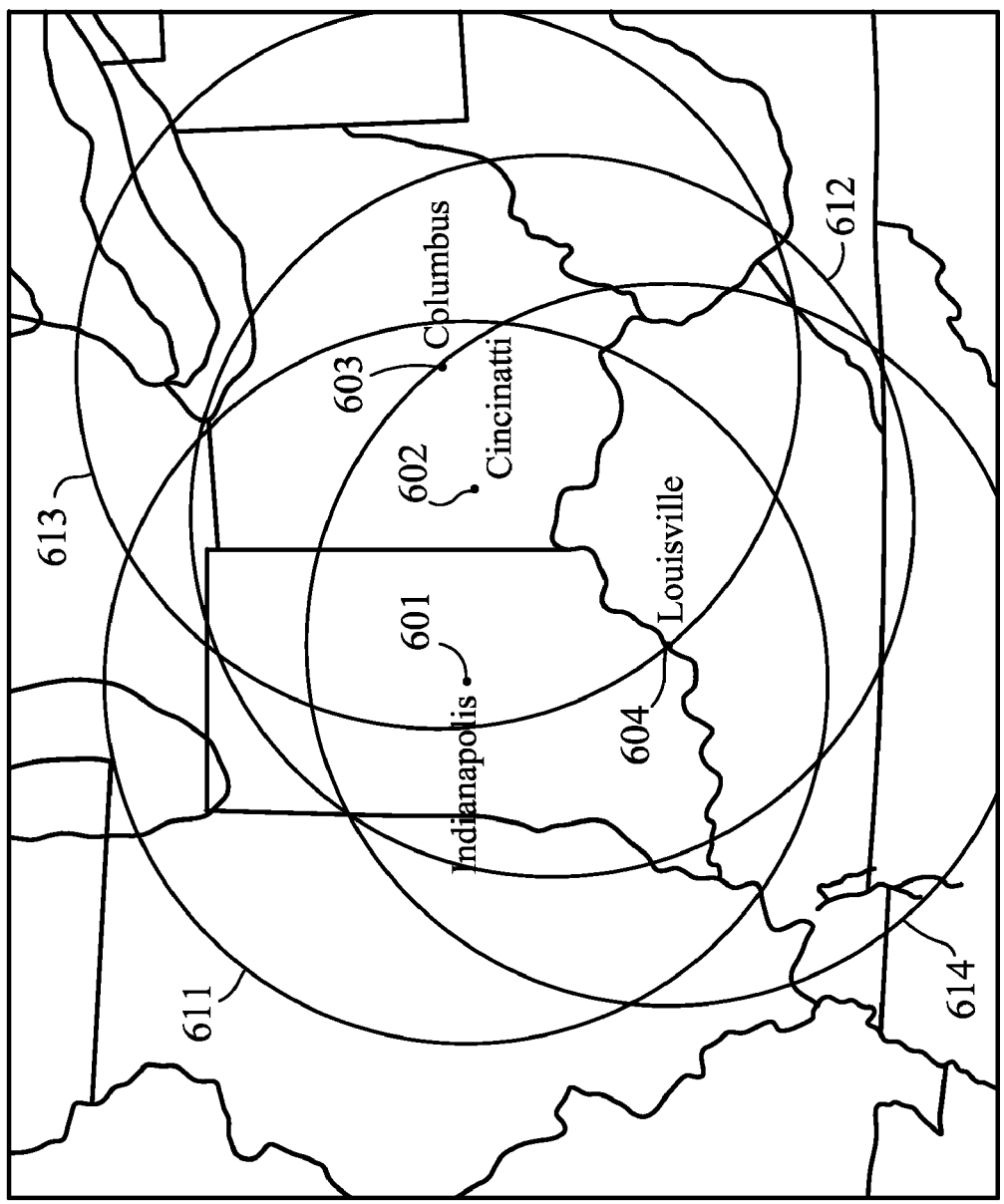
FIG. 6 is a map indicating en route coverage that might be expected from single ADS-B sensors located at four mid-west USA airports (Cincinnati, Louisville, Indianapolis and Columbus).

For example, FIG. 6 is a map illustrating the indicative en route coverage that might be expected from single ADS-B sensors located at four mid-west USA airports (Cincinnati 602, Louisville 605, Indianapolis 601, and Columbus 603). The circles shown in the map illustrate the potential coverage range of each ADS-B sensor. Circle 611 illustrates the potential coverage area for Indianapolis sensor 601. Circle 612 illustrates the potential coverage area for Cincinnati sensor 601. Circle 613 illustrates the potential coverage area for Columbus sensor 603. Circle 614 illustrates the potential coverage area for Louisville sensor 604. The solution is designed to have significant overlapping coverage to provide for a failure in one of the sensors or its associated infrastructure.

Figure 7:
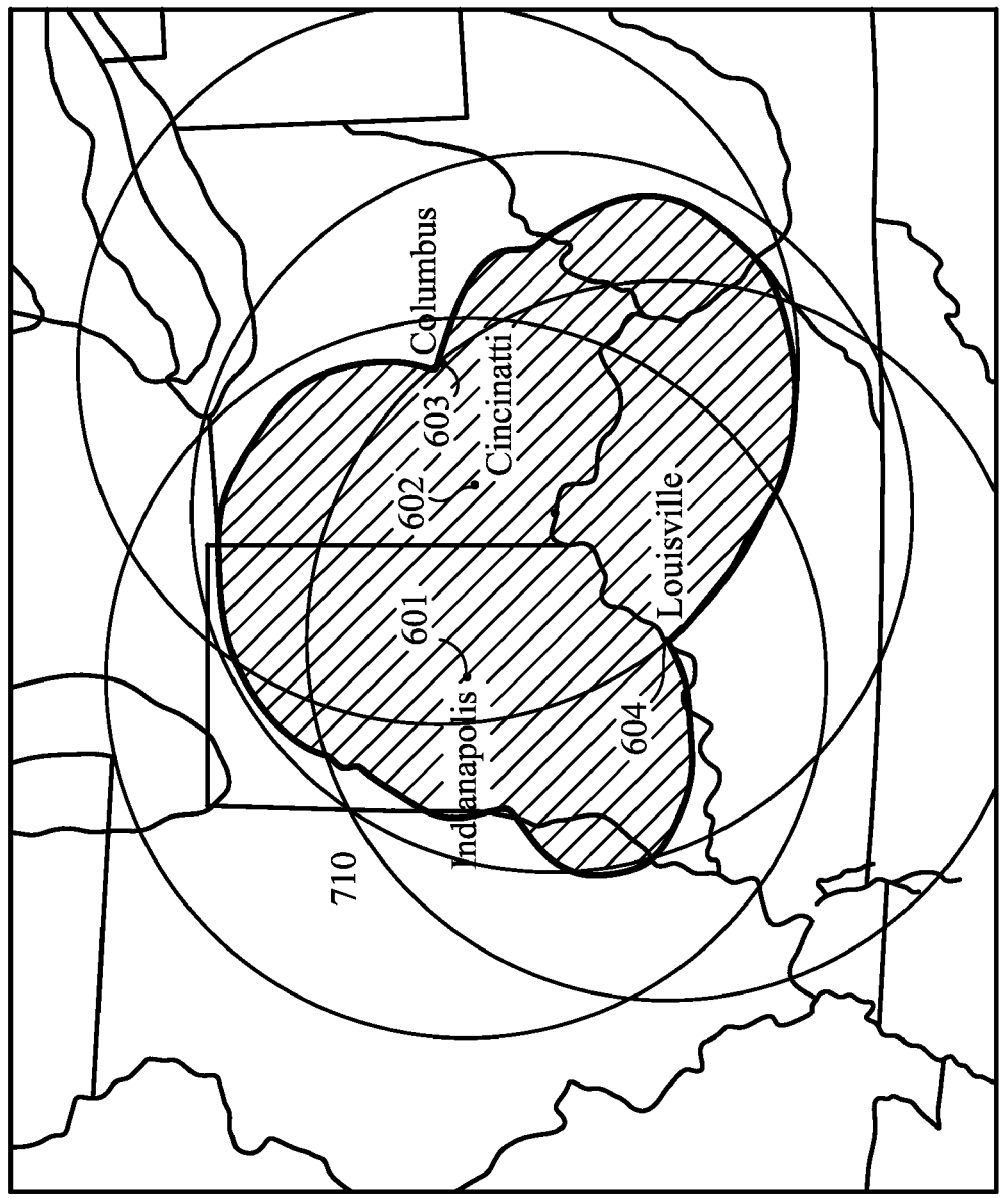
FIG. 7 is a map indicating ADS-X coverage for the same four sensors, with the wider ADS-B coverage area enhanced with a core area where an independent multilateration position could be derived from the same four sensors, in this case with no additional cost or infrastructure.

FIG. 7 is a map illustrating shows the ADS-X coverage area for the same four sensors 601, 602, 603, and 604. Where at least two circles overlap, it may be possible to track a line of precision for an aircraft. Where at least three circles overlap, it may be possible to determine aircraft position in three dimensions. The wider ADS-B coverage area enhanced with a core area 710 where an independent multilateration position could be derived from the same four sensors, in this case with no additional cost or infrastructure.

If ADS-X techniques are being used to assist in the transition to ADS-B by providing position information for aircraft without ADS-B avionics, a complete three or four sensor solution may be required for each point in the required surveillance area. However; when ADS-B equipage is high, the use of multilateration techniques may be restricted to validation of ADS-B self-reports and, in this case, it will be possible to use bi-lateration techniques to further reduce or eliminate the differential cost between ADS-B and ADS-X designs.

Figure 8:
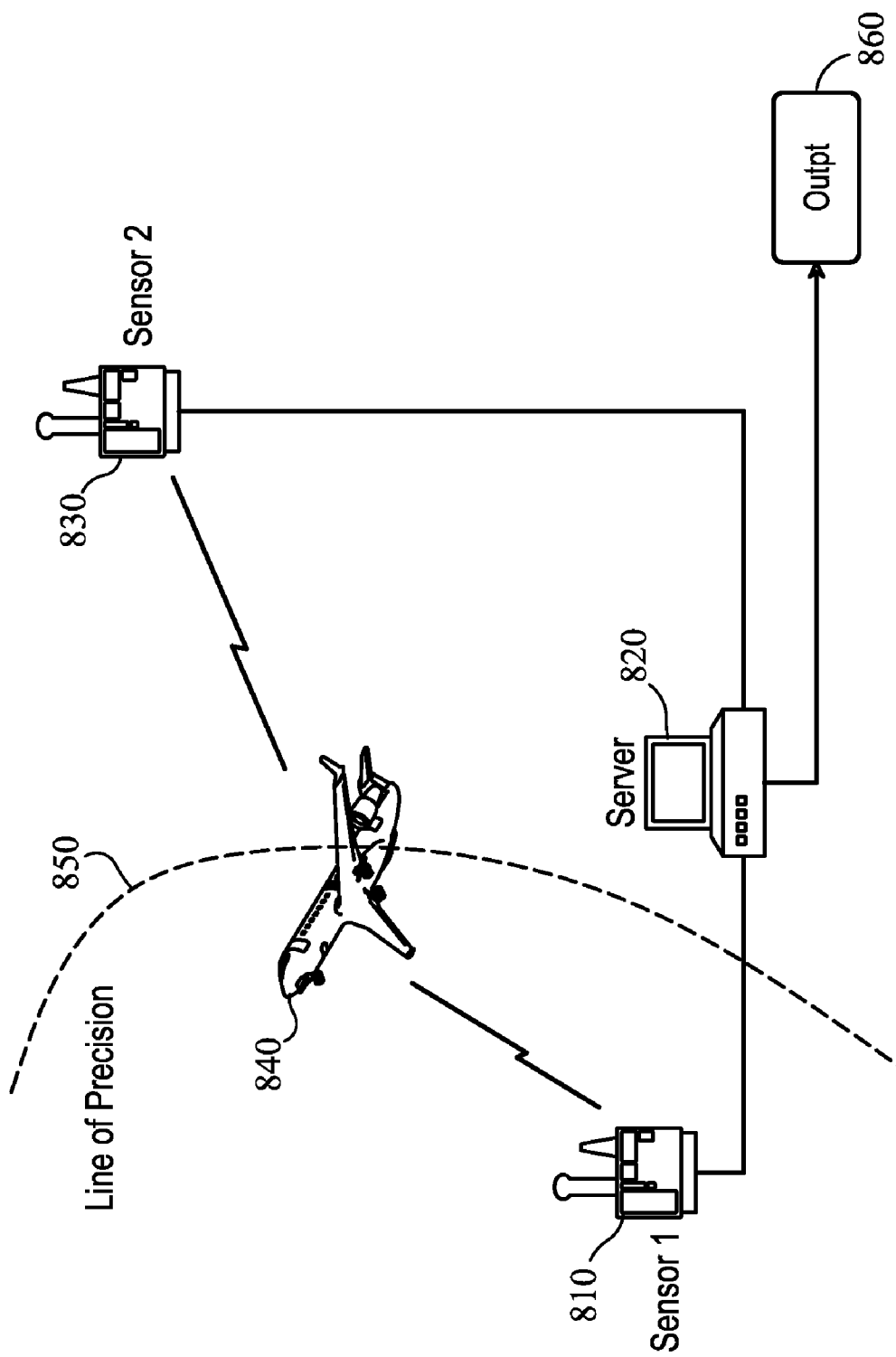
FIG. 8 is a diagram illustrating an example of an ADS-B message received at two separate ADS-X ground stations and, while this is not sufficient to determine a 3-d position in space, it is, when combined with barometric altitude information, sufficient to determine a line of precision on which the aircraft must be located.

For example, in FIG. 8, the ADS-B message from aircraft 840 may be received at two separate ADS-X ground stations 810 and 830. While this may not be sufficient to determine a 3-D position in space, it is, when combined with barometric altitude information, sufficient to determine a line of precision 840 on which the aircraft must be located. In a dynamic situation, it is almost impossible for an inaccurate or spoofed ADS-B report to simultaneously maintain a valid position on the changing line of precision, therefore this technique can be used for ADS-B validation and aircraft tracking. Hybrid surveillance solutions can be designed which combine ADS-B, multilateration, bi-lateration and other techniques to provide a pragmatic and cost-effective approach to addressing ADS-B implementation issues.

Another challenge for multilateration as a backup for ADS-B is that wide area multilateration systems require extremely accurate synchronization of clock signals between the ground stations. This synchronization has generally been achieved using GPS satellite signals as time references. However, using GPS satellite signals creates a potential dependency and hence an unacceptable common mode of failure between the ADS-B and multilateration components of the ADS-X solution. Alternate methods of clock synchronization for the remote stations have been identified and can be used to offset this impact. See, e.g., Smith, A., et al, *System Wide ADS-B Back-Up and Validation,* 6th ICNS Conference and Workshop, Baltimore, May 2006, incorporated herein by reference.

Before multilateration can be used as a backup for ADS-B for advanced ATC functions such as separation, the required standards and safety cases must be developed for multilateration. Perhaps ironically, although multilateration is the less revolutionary of the two technologies (the timing of signal receipt from aircraft transponders is a similar technique, using the same avionics, as for today's SSRs), standards development for ADS-B is currently more advanced than it is for multilateration with proposed changes for ICAO Air Traffic Management procedures being circulated and performance and interoperability specifications for ADS-B infrastructure also in draft version. See, e.g., "*Air Traffic Management*", *ICAO, Procedures for Air Navigation Services*, Document 4444, Fourteenth edition—proposal to update Amendment 4 to include ADS-B procedures in Chapter 8, incorporated herein by reference.

As a part of the FAA's ADS-B program, the FAA plans, through a series of simulations and flight test validations to analyze separation errors for ADS-B, and to seek separation standards approval for terminal and en route phases by 2009. This ongoing process has not prevented some authorities from implementing ADS-B based separation standards ahead of the formal standards process. For example, in Australia, ADS-B is already being used for 5 nm separation in the Bundaberg area as a result of a safety case based on Comparison to Monopulse SSR using ICAO Doc 9689 methodology. See, *ADS-B Regulation—CASA Australia presentation to ICAO ADS-B Task Force*, New Delhi, 2006, incorporated herein by reference.

The current interest in multilateration deployment, the absence of requirement for avionics changes, and the "radar-like" standards being established for ADS-B are all expected to result in an accelerated progress for multilateration standards in the short term. It is likely that some countries will, as with ADS-B, implement multilateration for separation in advance of these standards based on suitable safety case development.

Figure 9:
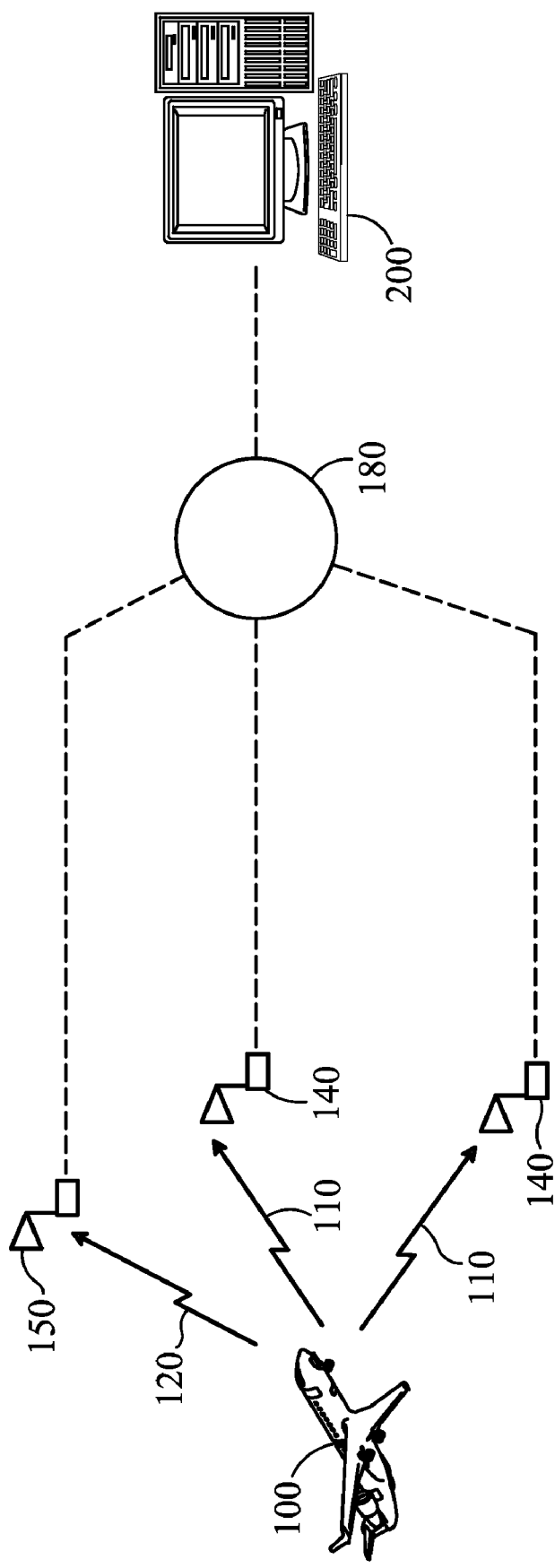
FIG. 9 is a block diagram of a first embodiment of the present invention, where the system for deployable passive broadband detection is extended by incorporating the capability to decode position for ADS-B, SSR multilateration, and broadband multilateration.

FIG. 9 is block diagram illustrating a first embodiment of the present invention, providing integrated tracking using passive broadband. As illustrated in the embodiment of FIG. 9, the invention takes the system for deployable passive broadband detection and extends it by incorporating the capability to decode position for ADS-B, SSR multilateration, and broadband multilateration. In this embodiment, aircraft 100 transmits a signal, which is received at a minimum of three stations 140, 140, and 150. Antenna 150 may receive ADS-B signals and generate an ADS-B position signal as generated by aircraft 100. Antennas 140 may receive other signals but may not necessarily generate ADS-B position data. Signals 110, 120 may include all pulse and high bandwidth signals emanating from aircraft 100 including, but not limited to, UAT, DME, TACAN, SSR, Mode S, ADS-B, Pulse Radar, Weather Radar, Communications, and Military Radar.

In the embodiment of FIG. 9, it is assumed that ADS-B is transmitted by the aircraft 120 and is received by at least one ground station 150. All ground stations 140, 150 receive all other transmissions be they UAT, DME, TACAN, SSR, Mode S, ADS-B, Pulse Radar, Weather Radar, Communications, or Military Radar. Comparator 180 compares the ADS-B reported position from antenna 150 with a line of precision or a triangulated position determined from all antennas 140, 140, and 150 based on any high frequency signal emanating from the aircraft be it UAT, DME, TACAN, SSR, Mode S, ADS-B, Pulse Radar, Weather Radar, Communications, or Military Radar, and provides the following information to the user 200:

1) ADS-B self reported position

2) Validated position and identification based on transponder/SSR information

3) Validated position and identification, if available, from all other high frequency signals 4) Information about the validity and integrity of the data, especially the ADS-B self-reported position.

The embodiment of FIG. 9 is thus capable of tracking aircraft whether or not they have ADS-B, operating transponders, or other high frequency avionics devices.

Figure 10:
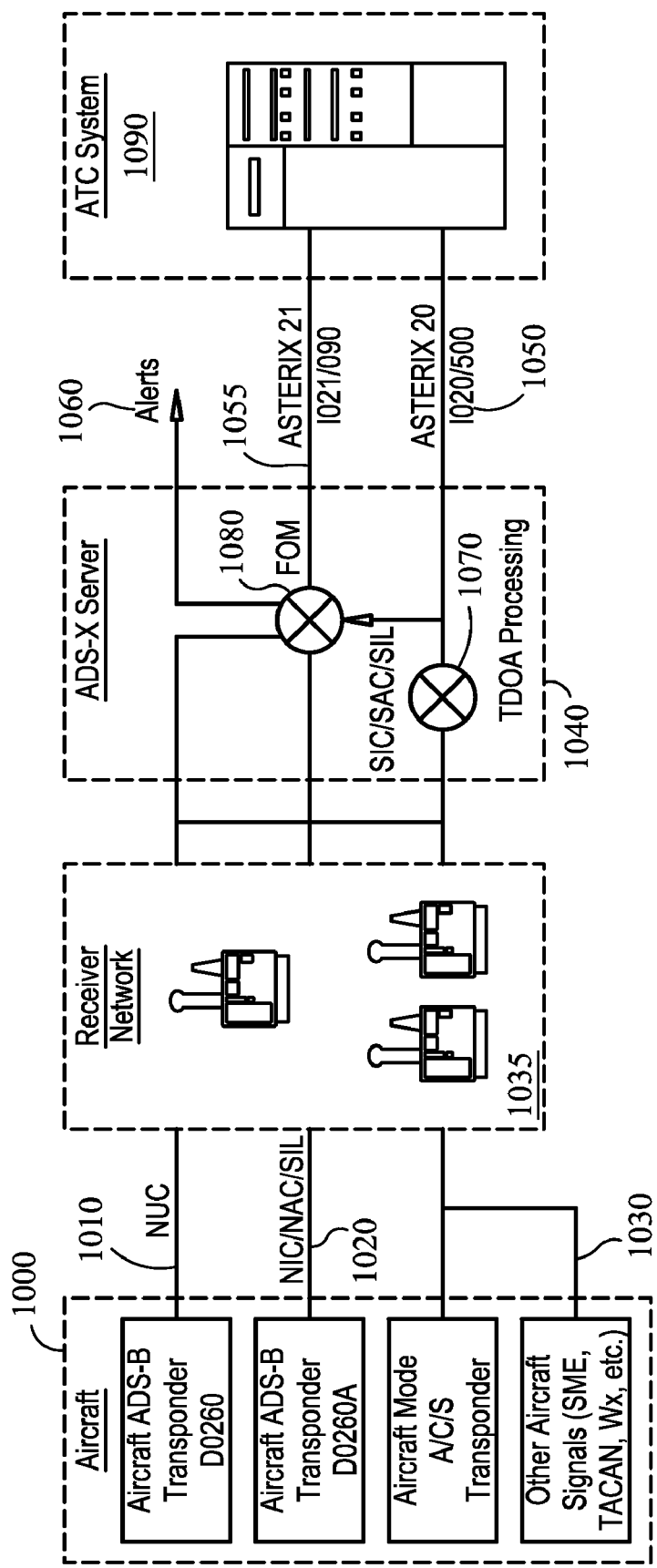
FIG. 10 is a block diagram of a second embodiment of the present invention, which takes the system for deployable passive broadband detection and extends it by incorporating the capability to decode self-reported position for ADS-B, and compare it to line of calculated position, or line of precision, derived from multilateration techniques applied to various signals received from the aircraft.

FIG. 10 is a block diagram illustrating a second embodiment of the present invention, providing validation of a self-reported position. In this embodiment of the present invention takes the system for deployable passive broadband detection and extends it by incorporating the capability to decode self-reported position for ADS-B, and compare it to line of calculated position, or line of precision, derived from multilateration techniques applied to various signals received from the aircraft.

Referring to FIG. 10, aircraft 1000 emits an ADS-B position report 1010 along with associated quality and integrity information (NIC/NAC/SIL) 1020, as well transponder and other aircraft signals 1030. These signals 1010, 1020, and 1030 are received at one or more of the stations 1035 and is decoded and made available for onward processing to the ATC system 1090.

Simultaneously, the same signal, and/or other signals emitted by the aircraft 1010, 1020, and 1030, are received at a number of stations and a position, or line of precision, is calculated using multilateration techniques by TDOA processor 1070, as previously outlined. Equivalent measures of data quality and integrity are derived for this information based on the known geometry of the stations and the number of receiving stations, amongst other factors.

Data from the two sources is compared in comparator 1080 in ADS-X server 1040 and the "Figure Of Merit" (FOM) for the ADS-B self-reported position is adjusted to reflect the additional information now available to assess the report validity 1050, 1055. Optionally an alert 1060 may also be raised. The FOM may comprise a numerical value indicating the relative accuracy of the self-reported aircraft position versus the determined position from multilateration. This FOM may be adjusted based upon the accuracy of the multilateration equipment and other values. A high FOM indicates a high level of confidence in the self-reported position value. A low FOM indicates a low level of confidence in the self-reported position value.

This FOM may be compared to a threshold value, which may be adjusted depending upon a number of circumstances, to prevent false alarms from being generated, and also to prevent false negatives. If the FOM is below a predetermined threshold value, an alarm may be sounded to indicate to an operator that the authenticity of the aircraft in question should be investigated. The threshold may be set higher, for example, near sensitive areas (major cities, military bases) or may be lowered depending upon the accuracy of the self-reported position equipment on the aircraft.

Figure 11:
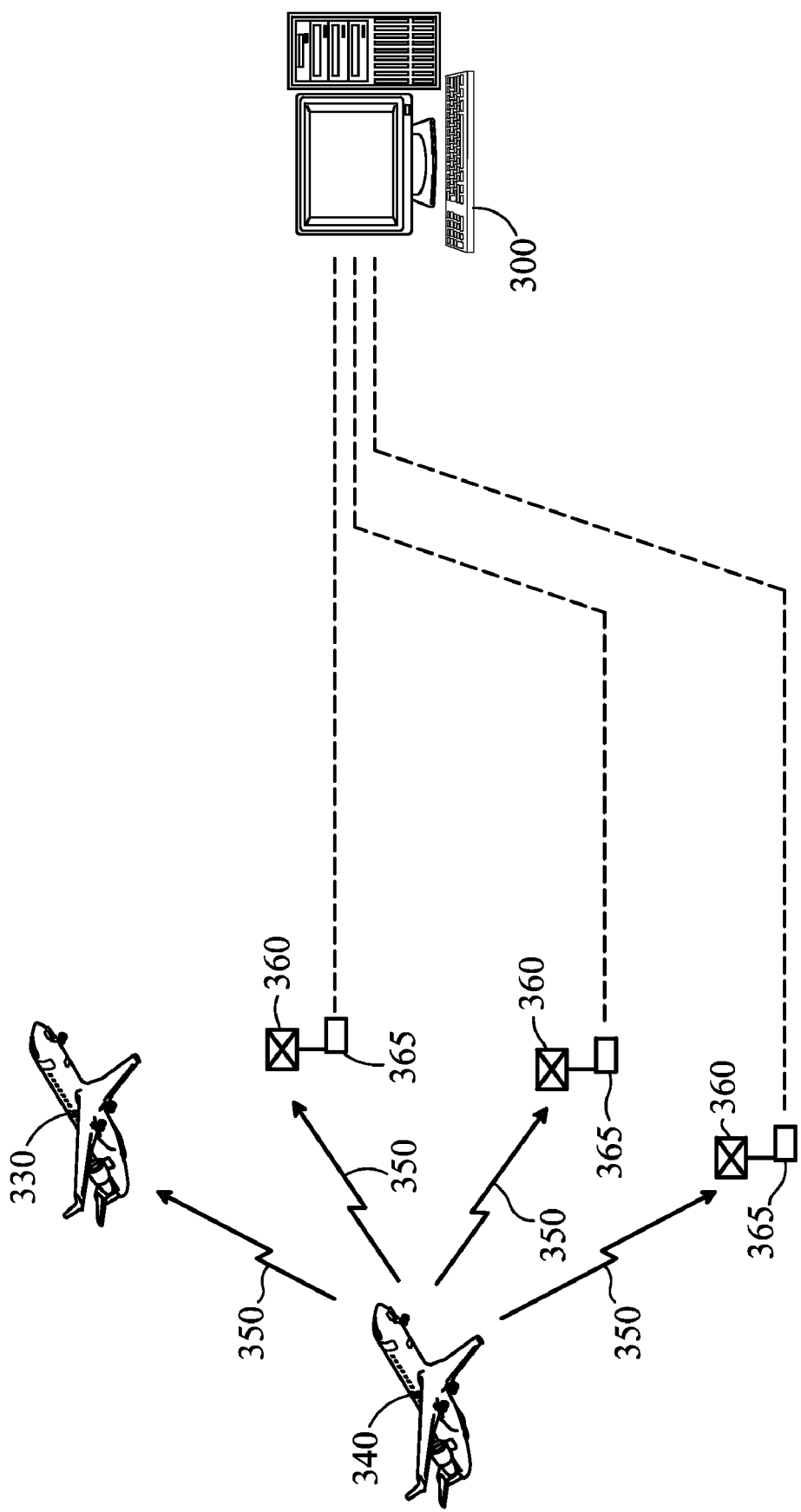
FIG. 11 is a block diagram of the third embodiment of the present invention, which shows a passive ranging and passive Angle of Arrival ground-based surveillance system and vehicle-based surveillance system that provides the capabilities to decode self-reported ADS-B position, determine independent surveillance position of an ADS-B target using passive ranging and passive Angle of Arrival measurement techniques, and validate self-reported ADS-B position using the independent surveillance position.

FIG. 11 is a block diagram of the third embodiment of the present invention, which shows a passive ranging and passive Angle of Arrival ground-based surveillance system and vehicle-based surveillance system that provides the capabilities to decode self-reported ADS-B position, determine independent surveillance position of an ADS-B target using passive ranging and passive Angle of Arrival measurement techniques, and validate self-reported ADS-B position using the independent surveillance position.

As shown in the third embodiment illustrated in FIG. 11, the aircraft [340] broadcasts an ADS-B report signal [350] that is received by another airborne aircraft [330] and ground based direction finding antennas [360]. The receivers [365] decode and measure the Angle of Arrival and Time of Arrival of the ADS-B report signal [350]. The Angle of Arrival, Time of Arrival, decoded data, including altitude and identification, are sent by the receiver [365] to the surveillance processor [300]. The surveillance processor [300] decodes the ADS-B position signal to determine self-reported ADS-B position.

Surveillance processor 300 performs independent surveillance target position determination:

1. Determines the time slot of ADS-B signal transmission and computes corresponding Time of ADS-B Transmission based on Minimum Operation Performance Standards
2. Computes the range corresponding to the time difference between the Time of ADS-B Transmission and Time of Arrival.
3. Computes an independent surveillance target position with respect to each receiver 365 using the passive range and passive Angle of Arrival data.
4. Performs surveillance data fusion of independent surveillance target position data for all receivers 365 when more than one receiver 365 is used to compute independent surveillance target position.

Surveillance processor 300 performs self-reported ADS-B position validation by comparing the independent surveillance target position to the decoded self-reported ADS-B position for aircraft 340 and the "Figure Of Merit" (FOM) for the self-reported ADS-B position is adjusted to reflect the additional independent surveillance information now available to assess the report validity. Other aircraft 330 receiving the ADS-B report signal 350 and that are equipped with passive ranging and Angle of Arrival measurement perform the same position determination and validation that is performed by the ground elements 360, 365, 300.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A system for validating aircraft self-reported position, comprising:
    a plurality of antennas for receiving radio signals from an aircraft, including an aircraft self-reported position;
    a processor, coupled to the plurality of antennas, for determining aircraft position through time difference of arrival processing of the signals from the aircraft to produce a determined aircraft position; and
    a comparator, coupled to the processor, for comparing the determined aircraft position with the aircraft self-reported position and determining whether the self-reported position is within a predetermined range of the determined position.

2. The system of claim 1, wherein the radio signals from the aircraft comprise high frequency radio signals emanating from the aircraft.

3. The system of claim 2, wherein the high frequency radio signals comprise one or more of UAT, DME, TACAN, SSR, Mode S, ADS-B, Pulse Radar, Weather Radar, Communications, Military Radar or a pulse emitter.

4. The system of claim 1, wherein the comparator generates a (FOM) indicating a level of confidence in the aircraft self-reported position.

5. The system of claim 1, further comprising:
    an alarm, coupled to the comparator, for generating an alarm signal if the FOM is below a predetermined threshold value.

6. The system of claim 1 wherein the processor determines at least one line of precision based upon signals received from at least two of the plurality of antennas.

7. The system of claim 6, wherein the comparator compares the line of precision to the aircraft self-reported position and generates an alert if the aircraft self-reported position is not within a predetermined range of the line of precision.

* * * * *